United States Patent
Shingu et al.

(10) Patent No.: US 9,958,868 B2
(45) Date of Patent: May 1, 2018

(54) MOVING OBJECT CONTROLLER, MOVING OBJECT CONTROL METHOD, AND INTEGRATED CIRCUIT

(71) Applicants: MegaChips Corporation, Osaka-shi (JP); Kyushu Institute of Technology, Kitakyushu-shi (JP)

(72) Inventors: Fumiya Shingu, Osaka (JP); Norikazu Ikoma, Fukuoka (JP); Kenta Nagamine, Osaka (JP); Hiromu Hasegawa, Osaka (JP)

(73) Assignees: MegaChips Corporation, Osaka-shi (JP); KYUSHU INSTITUTE OF TECHNOLOGY, Kitayushu-shi (JP)

( * ) Notice: Subject to any disclaimer, the term of this patent is extended or adjusted under 35 U.S.C. 154(b) by 98 days.

(21) Appl. No.: 15/076,813

(22) Filed: Mar. 22, 2016

(65) Prior Publication Data
US 2016/0282876 A1    Sep. 29, 2016

(30) Foreign Application Priority Data

Mar. 23, 2015    (JP) .................................. 2015-059367

(51) Int. Cl.
G05D 1/02    (2006.01)
G05D 1/00    (2006.01)
(Continued)

(52) U.S. Cl.
CPC ......... *G05D 1/0253* (2013.01); *G05D 1/0088* (2013.01); *G06K 9/00664* (2013.01);
(Continued)

(58) Field of Classification Search
CPC .... G05D 1/0253; G05D 1/0088; G06T 7/277; G06T 7/246; G06T 7/579; G06K 9/00791; G06K 9/00664
See application file for complete search history.

(56) References Cited

U.S. PATENT DOCUMENTS 5,144,685 A      9/1992  Nasar et al.
2006/0165276 A1  7/2006  Hong et al.
(Continued)

FOREIGN PATENT DOCUMENTS

EP    0 390 052 A2    10/1990
EP    1 684 143 A1     7/2006
(Continued)

OTHER PUBLICATIONS

European Official Communication dated Jul. 26, 2016 in Application No. 16 156 691.4.
(Continued)

*Primary Examiner* — Rodney A Butler
(74) *Attorney, Agent, or Firm* — Oblon, McClelland, Maier & Neustadt, L.L.P.

(57) ABSTRACT

A moving object controller efficiently generates an environmental map and performs highly accurate state estimation in a short time to appropriately control a moving object. An observation obtaining unit obtains observation data from an observable event. A landmark prediction unit generates a landmark prediction signal including predictive information about a landmark at a current time. A landmark detection unit detects information about the landmark at the current time, and generates a landmark detection signal indicating the detection result. A state estimation unit estimates an internal state of the moving object to obtain data indicating an estimated internal state of the moving object at the current time, and estimates the environmental map based on the landmark detection signal to obtain data indicating an estimated environmental map at the current time.

8 Claims, 11 Drawing Sheets

(51) Int. Cl.
  *G06K 9/00*   (2006.01)
  *G06T 7/579*  (2017.01)
  *G06T 7/246*  (2017.01)
  *G06T 7/277*  (2017.01)

(52) U.S. Cl.
  CPC .......... *G06K 9/00791* (2013.01); *G06T 7/246* (2017.01); *G06T 7/277* (2017.01); *G06T 7/579* (2017.01)

(56) References Cited

U.S. PATENT DOCUMENTS

| | | |
|---|---|---|
| 2008/0119961 A1 | 5/2008 | Myeong et al. |
| 2009/0312871 A1 | 12/2009 | Lee et al. |
| 2012/0029698 A1 | 2/2012 | Myeong et al. |
| 2012/0213443 A1* | 8/2012 | Shin ............... G05D 1/0246 382/190 |
| 2015/0304634 A1* | 10/2015 | Karvounis .......... G06T 7/277 348/46 |
| 2016/0055646 A1* | 2/2016 | Wirbel ............... G06T 7/74 382/107 |

FOREIGN PATENT DOCUMENTS

| | | |
|---|---|---|
| JP | 2008-126401 | 6/2008 |
| JP | 2011-48706 | 3/2011 |
| WO | WO 2008/013355 A1 | 1/2008 |

OTHER PUBLICATIONS

Extended European Search Report dated Nov. 2, 2016 in Patent Application No. 16156691.4.

Simone Frintrop, et al, "Attentional Landmark Selection for Visual SLAM", Proceedings of the 2006 IEEE/RSJ International Conference on Intelligent Robots and Systems, XP031006489, 2006, pp. 2582-2587.

Ronen Lerner, et al. "Landmark Selection for Task-Oriented Navigation", Proceedings of the 2006 IEEE/RSJ International Conference on Intelligent Robots and Systems, XP031006524, 2006, pp. 2785-2791.

Zhanyu Zhang, et al., "Monocular Vision Simultaneous Localization and Mapping using SURF", Proceedings of the 7th World Congress on Intelligent Control and Automation, XP031301132, 2008, pp. 1651-1656.

Vincent Zalzal, et al., "Mutual Localization of Mobile Robotic Platforms Using Kalman Filtering", IEEE Industrial Electronics, XP031077036, 2006, pp. 4540-4545.

* cited by examiner

MOVING OBJECT CONTROLLER, MOVING OBJECT CONTROL METHOD, AND INTEGRATED CIRCUIT

This application claims priority to Japanese Patent Application No. 2015-059367, filed on Mar. 23, 2015, the entire disclosure of which is hereby incorporated herein by reference (IBR).

BACKGROUND OF THE INVENTION

Field of the Invention

The present invention relates to a technique for controlling a moving object using simultaneous localization and mapping (SLAM).

Description of the Background Art

Using simultaneous localization and mapping (SLAM), a moving object, such as an autonomous robot, estimates its position and simultaneously generates an environmental map while moving autonomously.

A robot (moving object) that moves autonomously with SLAM generates an environmental map around the robot using observation data obtained with a sensor mounted on the robot and using inputs for controlling the robot, while estimating the position and the posture of the robot in the generated environmental map. More specifically, the robot estimates its position and posture $X_t$ (or $X_{1:t} = \{X_1, X_2, \ldots, X_t\}$) and an environmental map m using a control input sequence $U_{1:t} = \{U_1, U_2, \ldots, U_t\}$ and an observation sequence $Z_{1:t} = \{Z_1, Z_2, \ldots, Z_t\}$ in the state space model where the robot follows the system model $x_t \sim g\ (x_t|x_{t-1}, U_t)$ ($U_t$ is a control input) and the observation follows the observation model $Z_t \sim h\ (Z_t|x_t, m)$ (m is an environmental map).

Techniques have been developed to estimate the posture of a robot with high accuracy using particle filters (e.g., Japanese Unexamined Patent Application Publication No. 2008-126401, or Patent Literature 1).

A sensor used to obtain observation data may typically be an RGB camera incorporating a visible light image sensor, or a range finder that obtains distance information using infrared light or laser light. Two or more different sensors may be used in combination to obtain observation data.

A robot (moving object) that moves autonomously with SLAM typically generates a topological environmental map, instead of generating a geometric environmental map. The environmental map is obtained using, for example, information about landmarks. In this case, the environmental map contains a plurality of sets of landmark information. Each landmark has parameters including variance-covariance matrices expressing (1) positional information about the landmark and (2) the uncertainty of positional information about the landmark.

When the robot that moves autonomously with SLAM incorporates an RGB camera as its sensor, the robot uses, as landmarks, points or lines with features or objects with distinguishable markers. The robot detects (identifies) an image area corresponding to a landmark in an image captured by the RGB camera to obtain information about the landmark. In this case, the actual position of the robot relative to the actual position of the landmark is determined using the image obtained by the RGB camera, and observation data at the current time is obtained based on the identification result.

To determine the position of a landmark in an image obtained by the RGB camera, the above technique involves searching of the entire image to detect a landmark. This increases the amount of processing to identify the landmark position, and thus increases the processing time. The longer processing time taken to identify the position of a landmark increases the interval at which the estimation result is updated in the autonomous robot. This may cause a larger error between the actual posture of the robot and the estimate, and may disable the robot (moving object) from moving autonomously in a stable manner.

In response to the above problems, it is an object of the present invention to provide a moving object controller, a program, and an integrated circuit for controlling a moving object in an appropriate manner by generating an environmental map efficiently and performing a highly accurate state estimate process in a short period of time.

SUMMARY

A first aspect of the invention provides a moving object controller for controlling a moving object while performing processing for generating an environmental map expressed using information about a landmark and performing processing for estimating an internal state of the moving object. The controller includes an observation obtaining unit, a landmark prediction unit, a landmark detection unit, and a state estimation unit.

The observation obtaining unit obtains observation data from an observable event.

The landmark prediction unit generates a landmark prediction signal including predictive information about a landmark at a current time based on internal state data indicating an internal state of the moving object at a time preceding the current time and environmental map data at the time preceding the current time.

The landmark detection unit detects information about the landmark at the current time based on the landmark prediction signal generated by the landmark prediction unit, and generates a landmark detection signal indicating a result of the detection.

The state estimation unit estimates the internal state of the moving object based on the observation data obtained by the observation obtaining unit and the landmark detection signal to obtain data indicating an estimated internal state of the moving object at the current time, and estimates the environmental map based on the landmark detection signal to obtain data indicating an estimated environmental map at the current time.

DESCRIPTION OF THE PREFERRED EMBODIMENTS

First Embodiment

A first embodiment will now be described with reference to the drawings.

1.1 Structure of Moving Object Controller

Figure 1:
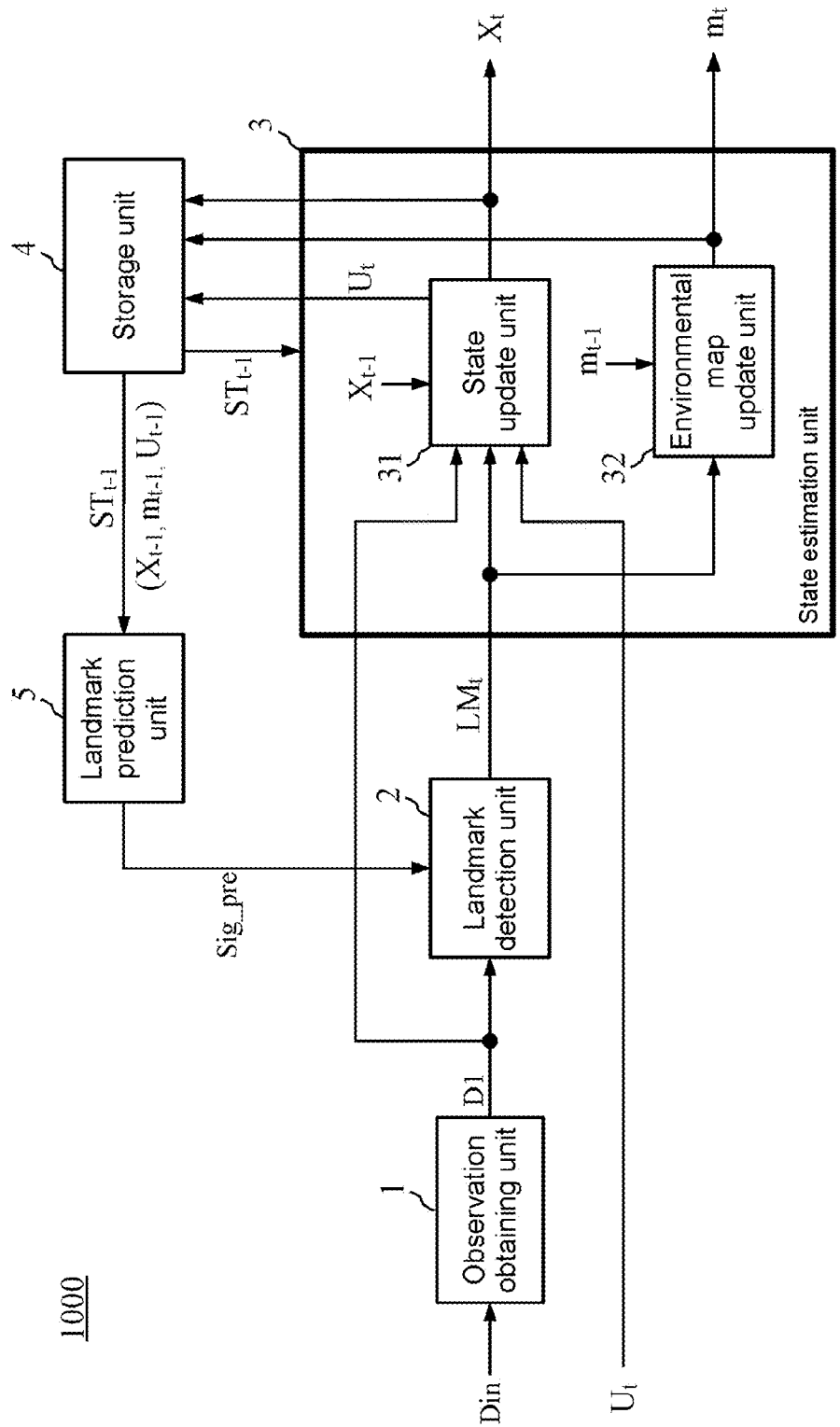
FIG. 1 is a schematic block diagram of a moving object controller 1000 according to a first embodiment.

FIG. 1 is a schematic block diagram of a moving object controller 1000 according to a first embodiment.

The moving object controller 1000 is mounted on a moving object, such as an autonomous robot Rbt1 (not shown).

As shown in FIG. 1, the moving object controller 1000 includes an observation obtaining unit 1, a landmark detection unit 2, a state estimation unit 3, a storage unit 4, and a landmark prediction unit 5.

For ease of explanation, observation data D1 obtained by the observation obtaining unit 1 is an image (image data) captured by an image sensor (not shown) mounted on the moving object.

The observation obtaining unit 1 receives input data Din and obtains observation data D1 based on the input data Din, and outputs the obtained observation data D1 to the landmark detection unit 2 and a state update unit 31 included in the state estimation unit 3.

The landmark detection unit 2 receives observation data D1, which is output from the observation obtaining unit 1, and a landmark prediction signal Sig_pre, which is output from the landmark prediction unit 5. The landmark detection unit 2 detects an image area corresponding to a landmark in an image formed using the observation data D1 (image data D1) based on the landmark prediction signal Sig_pre. The landmark detection unit 2 then outputs a signal including the detected image area to the state update unit 31 and an environmental map update unit 32 included in the state estimation unit 3 as a landmark detection signal $LM_t$.

As shown in FIG. 1, the state estimation unit 3 includes the state update unit 31 and the environmental map update unit 32.

The state update unit 31 receives observation data D1, which is output from the observation obtaining unit 1, a landmark detection signal $LM_t$, which is output from the landmark detection unit 2, control input data $U_t$ for a moving object, and internal state data $X_{t-1}$ indicating the internal state of the moving object at time t−1, which is read from the storage unit 4. The state update unit 31 estimates the internal state of the moving object based on the observation data D1, the landmark detection signal $LM_t$, the control input data $U_t$, and the internal state data $X_{t-1}$ of the moving object at time t−1 to obtain the estimation result as the internal state data $X_t$ of the moving object at the current time t (update the internal state data). The state update unit 31 then outputs the internal state data $X_t$ of the moving object at the current time t out of the state estimation unit 3, and also to the storage unit 4. The internal state data $X_t$ externally output from the state estimation unit 3 is used by, for example, a functional unit (central control unit) that centrally controls the moving object (autonomous robot) (not shown) as data used to control the moving object (autonomous robot).

The state update unit 31 outputs the control input data $U_t$ for a robot Rbt1 at the current time t to the storage unit 5.

The environmental map update unit 32 receives a landmark detection signal $LM_t$, which is output from the landmark detection unit 2, and environmental map data $m_{t-1}$ at time t−1, which is read from the storage unit 4. The environmental map update unit 32 obtains information about a detected landmark based on the landmark detection signal $LM_t$, and updates the environmental map data based on the obtained information and the environmental map data $m_{t-1}$ at time t−1 to obtain environmental map data $m_t$ at the current time t. The environmental map update unit 32 then outputs the updated environmental map data $m_t$ out of the state estimation unit 3, and also to the storage unit 4. The environmental map data $m_t$ externally output from the state estimation unit 3 is used by, for example, the functional unit (central control unit) that centrally controls the moving object (autonomous robot) (not shown) as data used to control the moving object (autonomous robot).

The storage unit 4 receives and stores internal state data $X_t$ of the moving object at the current time t and control input data $U_t$, which are output from the state update unit 31 included in the state estimation unit 3, and environmental map data $m_t$. The data stored in the storage unit 4 is read by the landmark prediction unit 5 at predetermined timing. The data stored in the storage unit 4 is also read by the state estimation unit 3 at predetermined timing. The storage unit 4 can store a plurality of sets of internal state data and environmental map data obtained at a plurality of times.

The landmark prediction unit 5 reads internal state data and environmental map data at a time preceding the current time from the storage unit 4.

In the example described below, the landmark prediction unit 5 reads data at time t−1, which is the time preceding the current time t by one time.

The data at the current time t refers to data obtained using the target observation data D1 by the moving object controller 1000 (internal state data $X_t$ of the moving object and environmental map data $m_t$). The data at time t−1 preceding the current time t by one time refers to data obtained by the moving object controller 1000 at the time preceding the current time t by one time (internal state data $X_{t-1}$ of the moving object and environmental map data $m_{t-1}$). The data at time t−k preceding the current time t by k times (k is a natural number) refers to data obtained by the moving object controller 1000 at the time preceding the current time t by k times (internal state data $X_{t-k}$ of the moving object and environmental map data $m_{t-k}$).

The above data may be obtained at synchronous timing or at asynchronous timing.

1.2 Operation of Moving Object Controller

The operation of the moving object controller 1000 with the above-described structure will now be described.

In the example described below, the robot Rbt1 is a moving object that moves autonomously. The input data Din is an image (captured image) captured by an imaging device (not shown) incorporating a visible light image sensor, which is mounted on the robot Rbt1. The environmental map is generated based on information about landmarks.

Figure 2:
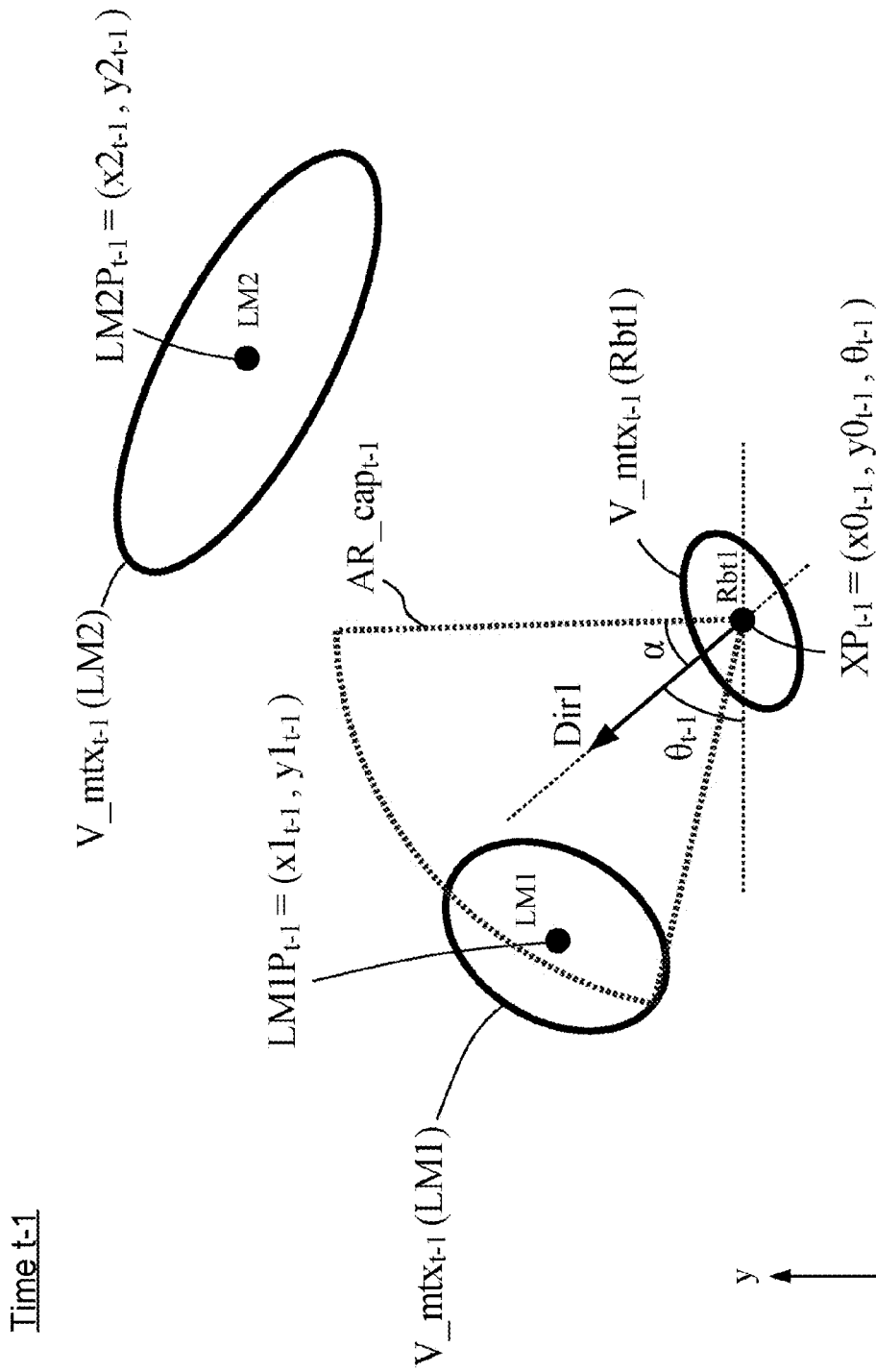
FIG. 2 is a diagram describing the positional relationship between the estimated positions of a robot Rbt1, a landmark LM1, and a landmark LM2 at time t−1.

FIG. 2 is a diagram describing the positional relationship between the estimated positions of the robot Rbt1, a landmark LM1, and a landmark LM2 at time t−1 (viewed from above). In FIG. 2, the space is defined by x-axis and y-axis, and the origin indicated by 0.

Figure 3:
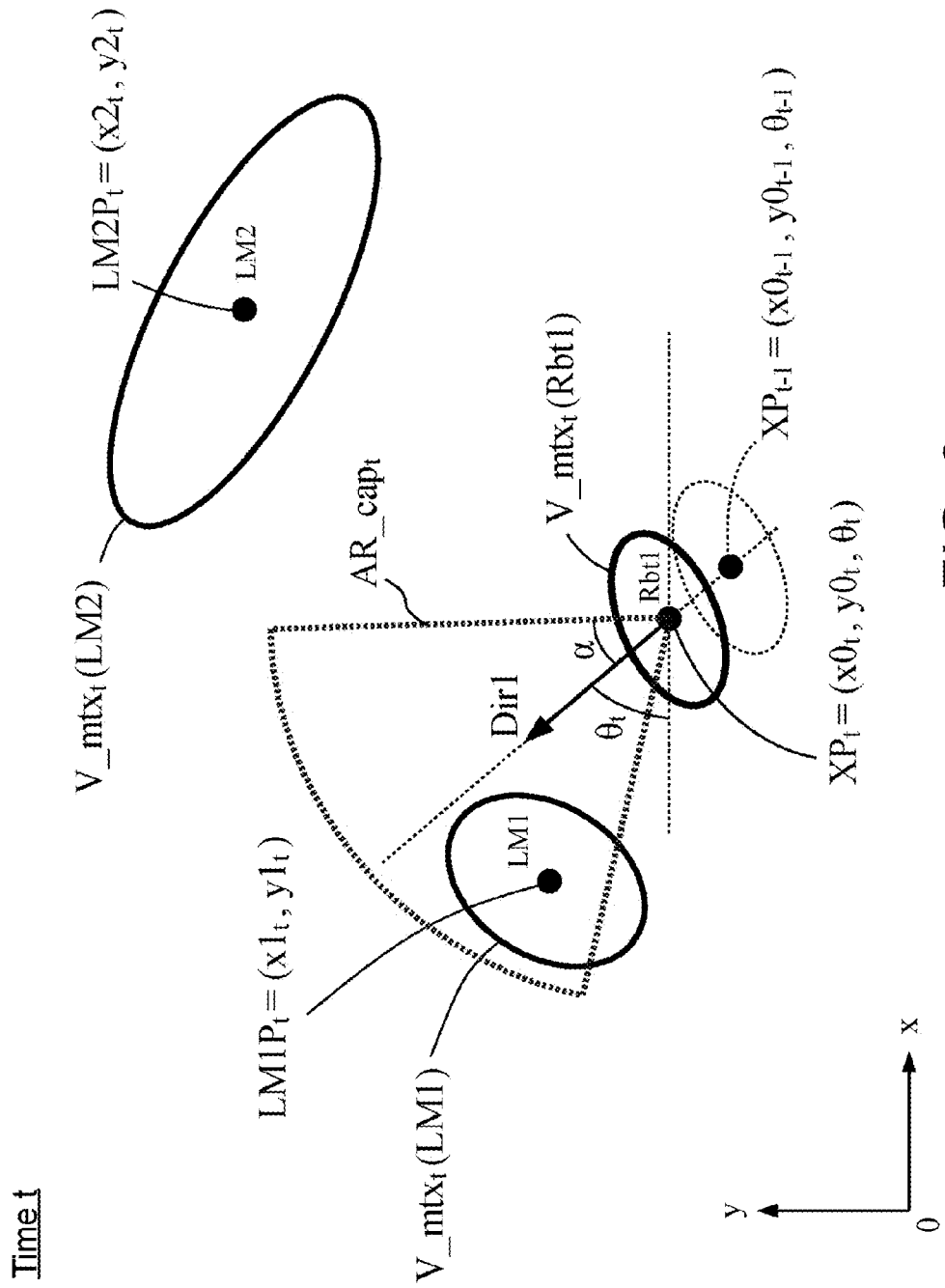
FIG. 3 is a diagram describing the positional relationship between the estimated positions of the robot Rbt1 and the landmarks LM1 and LM2 at time t.

FIG. 3 is a diagram describing the positional relationship between the estimated positions of the robot Rbt1 and the landmarks LM1 and LM2 at time t (viewed from above). In FIG. 3, the space is also defined by x-axis and y-axis, and the origin as in FIG. 2.

In the example described below, the robot Rbt1 at the position shown in FIG. 2 receives input control data for moving the robot Rbt1 in the direction of arrow Dir1 shown in FIG. 2 at time t−1. The robot Rbt1 moves to the position shown in FIG. 3 at time t.

The moving object controller 1000 uses (1) data indicating the internal state of the robot Rbt1 and (2) data representing an environmental map described below.

1.2.1 Internal State Data of Robot Rbt1

The moving object controller 1000 uses, as data $X_t$ indicating the internal state of the robot Rbt1, (1) internal state data $XP_t$ indicating the position and the angle of the robot Rbt1 at time t, and (2) variance-covariance matrix data $V\_mtx_t(Rbt1)$ of the robot Rbt1 at time t.

The internal state data $X_t$ of the robot Rbt1 at time t is written as $$X_t = [XP_t, V\_mtx_t(Rbt1)].$$

The internal state data $XP_t$ indicating the position and the angle of the robot Rbt1 at time t is a three-dimensional state vector written as $$XP_t = (x0_t, y0_t, \theta_t),$$

where $x0_t$ is an expected value of the x-coordinate of the robot Rbt1 at time t, $y0_t$ is an expected value of the y-coordinate of the robot Rbt1 at time t, and $\theta_t$ is an expected value of the angle of the robot Rbt1 (orientation of the robot Rbt1) with respect to the negative direction of x-axis at time t.

The moving object controller 1000 uses particle filtering (Monte Carlo approximation) to estimate the internal state of the robot Rbt1.

In particle filtering, the posterior probability distribution of a state vector $XP_{t-1}$ at time t−1 is used as the prior probability distribution of the state vector $XP_t$ at the current time t, and the predictive probability distribution of the state vector $XP_t$ at the current time t is obtained through prediction using the prior probability distribution of the state vector $XP_t$ at the current time t. A likelihood is then calculated based on the obtained predictive probability distribution and actual observation data (observation data at the current time t). At the ratio proportional to the calculated likelihood, particles are sampled without changing the total number of the particles. Through the processing, the internal state of the robot Rbt1 is estimated.

Figure 4:
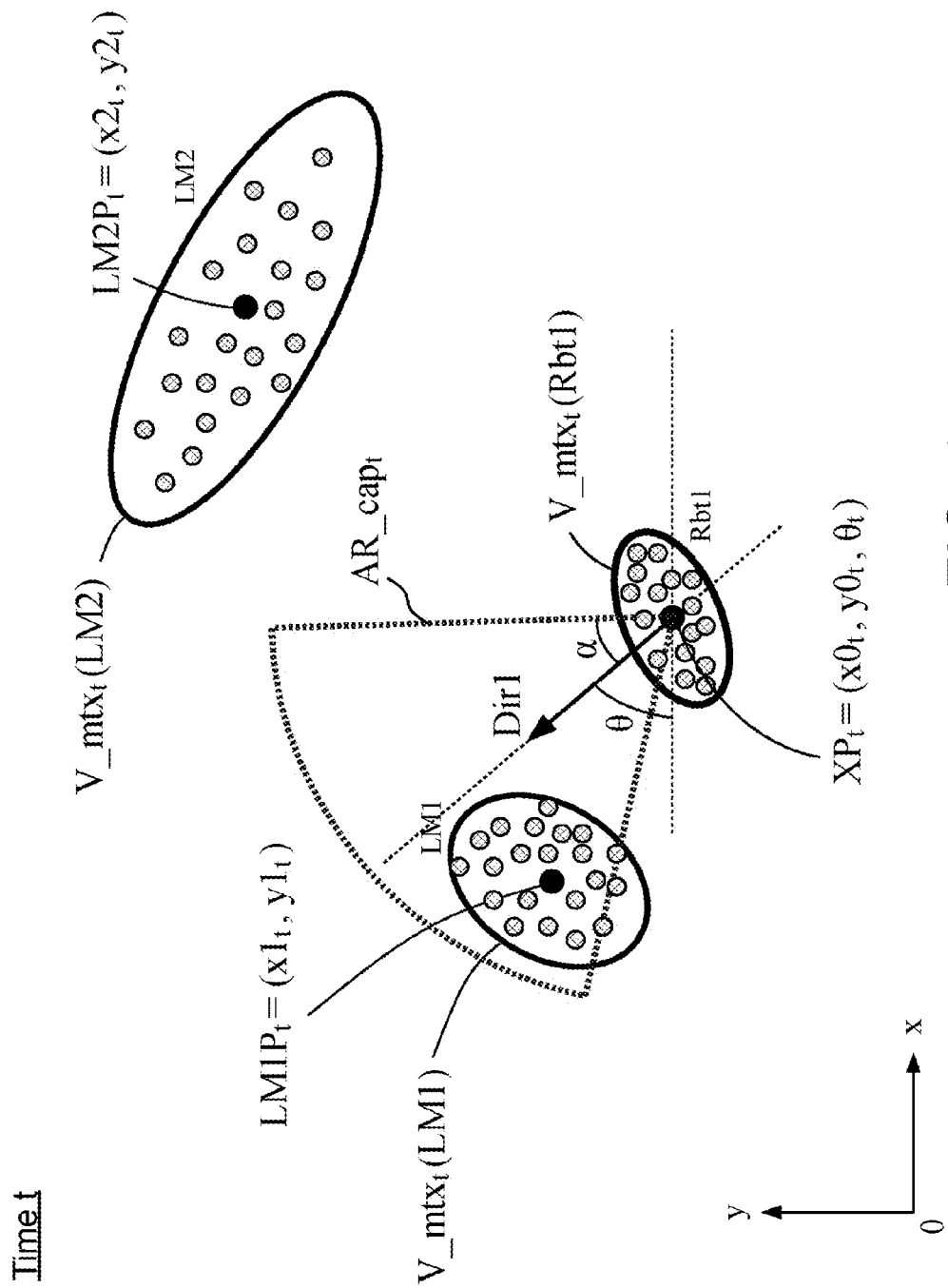
FIG. 4 is a schematic diagram describing the distribution of particles (one example) for estimating the position of the robot Rbt1 on the x-y plane of the internal state of the robot Rbt1 and the distribution of particles (one example) for estimating the positions of the landmarks LM1 and LM2 on the x-y plane of the internal state of the robot.

FIG. 4 is a schematic diagram describing the distribution of particles (one example) for estimating the position of the robot Rbt1 on the x-y plane of the internal state of the robot Rbt1.

In this example, M1 particles (M1 is a natural number) are used to estimate the internal state of the robot Rbt1.

The moving object controller 1000 uses the variance-covariance matrix data $V\_mtx_t(Rbt1)$ of the robot Rbt1 at time t as data indicating the internal state of the robot Rbt1. More specifically, the variance-covariance matrix data $V\_mtx_t(Rbt1)$ of the robot Rbt1 at time t is written using the formula below.

Formula 1

$$V\_mtx_t(Rbt1) = \begin{bmatrix} E[(x0_t^{(i)} - x0_t)(x0_t^{(i)} - x0_t)] & E[(x0_t^{(i)} - x0_t)(y0_t^{(i)} - y0_t)] \\ E[(y0_t^{(i)} - y0_t)(x0_t^{(i)} - x0_t)] & E[(y0_t^{(i)} - y0_t)(y0_t^{(i)} - y0_t)] \end{bmatrix} \quad (1)$$

In the formula, $x0_t^{(i)}$ is the x-coordinate of the i-th particle (i is a natural number, and $1 \leq i \leq M1$), which is used to estimate the internal state of the robot Rbt1, and $y0_t^{(i)}$ is the y-axis coordinate of the i-th particle (i is a natural number, and $1 \leq i \leq M1$), which is used to estimate the internal state of the robot Rbt1.

$E[a]$ is an expected value of a. In other words, $E[(x0_t^{(i)} - x0_t)(x0_t^{(i)} - x0_t)]$ is a variance of the x-coordinates of the M1 particles (M1 is a natural number) for estimating the internal state of the robot Rbt1. $E[(y0_t^{(i)} - y0_t)(y0_t^{(i)} - y0_t)]$ is a variance of the y-coordinates of the M1 particles (M1 is a natural number) for estimating the internal state of the robot Rbt1.

Further, $x0_t$ is an expected value (average value) of the x-coordinates of the M1 particles (M1 is a natural number), and $y0_t$ is an expected value (average value) of the y-coordinates of the M1 particles (M1 is a natural number).

As described above, the moving object controller 1000 uses (A) the internal state data $XP_t$ indicating the position and the angle of the robot Rbt1 at time t and (B) the variance-covariance matrix data $V\_mtx_t(Rbt1)$ of the robot Rbt1 at time t as the data $X_t$ indicating the internal state of the robot Rbt1.

1.2.2 Data Representing Environmental Map

The moving object controller 1000 generates environmental map data $m_t$ at time t as data representing an environmental map.

The environmental map data $m_t$ includes information about landmarks. When the robot Rbt1 detects a landmark, information about the detected landmark is added to the environmental map data $m_t$.

The moving object controller 1000 uses the environmental map data $m_t$ at time t written as $$m_t = [LM1P_t, V\_mtx_t(LM1), LM2P_t, V\_mtx_t(LM2), \ldots, LMkP_t, V\_mtx_t(LMk)],$$

where k is a natural number.

In this formula, $LMkP_t$ is internal state data corresponding to the position of the k-th landmark at time t, and $V\_mtx_t(LMk)$ is variance-covariance matrix data of the k-th landmark at time t.

At time t, information about the n-th landmark (n is a natural number, and $n \leq k$) at time t includes (A) the internal state data $LMnP_t$ and (B) the variance-covariance matrix data $V\_mtx_t(LMn)$. The data sets (A) and (B) for k landmarks are used as the environmental map data $m_t$ at time t.

In the example of FIG. 3, the environmental map data $m_t$ includes information about two landmarks LM1 and LM2. In the example of FIG. 3, the environmental map data $m_t$ is written as $$m_t = [LM1P_t, V\_mtx_t(LM1), LM2P_t, V\_mtx_t(LM2)].$$

More specifically, the environmental map data $m_t$ in FIG. 3 includes (1) internal state data $LM1P_t$ corresponding to the position of the landmark LM1 and variance-covariance matrix data $V\_mtx_t$ (LM1), and (2) internal state data $LM2P_t$ corresponding to the position of the landmark LM2 and variance-covariance matrix data $V\_mtx_t$ (LM2).

For ease of explanation, a case in which environmental map data is obtained using the two landmarks LM1 and LM2 will be described below with reference to FIGS. 2 and 3.

The internal state data $LM1P_t$ corresponding to the position of the landmark LM1 is a two-dimensional vector, and indicates an expected value of the position of the landmark LM1 on the x-y plane. In other words, the internal state data $LM1P_t$ corresponding to the position of the landmark LM1 is written as $$LM1P_t = (x1_t, y1_t),$$

where $x1_t$ is an expected value of the x-coordinate of the landmark LM1 at time t, and $y1_t$ is an expected value of the y-coordinate of the landmark LM1 at time t.

The internal state data $LM2P_1$ corresponding to the position of the landmark LM2 is a two-dimensional vector, and indicates an expected value of the position of the landmark LM2 on the x-y plane. In other words, the internal state data $LM2P_t$ corresponding to the position of the landmark LM2 is written as $$LM2P_t = (x2_t, y2_t),$$

where $x2_t$ is an expected value of the x-coordinate of the landmark LM2 at time t, and $y2_t$ is an expected value of the y-coordinate of the landmark LM2 at time t.

The moving object controller 1000 uses particle filtering (Monte Carlo approximation) to estimate information about landmarks.

In particle filtering to estimate internal state data corresponding to the position of the landmark LM1, the posterior probability distribution of the state vector $LM1P_{t-1}$ of the landmark LM1 at time t−1 is used as the prior probability distribution of the state vector $LM1P_t$ of the landmark LM1 at the current time t. The predictive probability distribution of the state vector $LM1P_t$ of the landmark LM1 at the current time t is obtained through prediction using the prior probability distribution of the state vector $LM1P_t$ of the landmark LM1 at the current time t. A likelihood is then calculated based on the obtained predictive probability distribution and actual observation data (observation data at the current time t). At the ratio proportional to the calculated likelihood, particles are sampled without changing the total number of the particles. Through the processing, the information (internal state) about the landmark LM1 is estimated.

In particle filtering to estimate internal state data corresponding to the position of the landmark LM2, the posterior probability distribution of the state vector $LM2P_{t-1}$ of the landmark LM2 at time t−1 is used as the prior probability distribution of the state vector $LM2P_t$ of the landmark LM2 at the current time t. The predictive probability distribution of the state vector $LM2P_t$ of the landmark LM2 at the current time t is obtained through prediction using the prior probability distribution of the state vector $LM2P_t$ of the landmark LM2 at the current time t. A likelihood is then calculated based on the obtained predictive probability distribution and actual observation data (observation data at the current time t). At the ratio proportional to the calculated likelihood, particles are sampled without changing the total number of the particles. Through the processing, the information (internal state) about the landmark LM2 is estimated.

FIG. 4 is a schematic diagram describing the distribution of particles (one example) for estimating the information about the landmarks LM1 and LM2 (internal state data corresponding to the position), or the positions of the landmarks LM1 and LM2 on the x-y plane.

M11 particles (M11 is a natural number) are used to estimate the information about the landmark LM1 (position on the x-y plane), and M12 particles (M12 is a natural number) are used to estimate the information about the landmark LM2 (position on the x-y plane).

Variance-covariance matrix data $V\_mtx_t$ (LM1) of the landmark LM1 at time t is used as the data indicating the information about the landmark LM1 (internal state of the landmark LM1). More specifically, the variance-covariance matrix data $V\_mtx_t$ (LM1) of the landmark LM1 at time t is written using the formula below.

Formula 2

$$V\_mtx_t(LM1) = \begin{bmatrix} E[(x1_t^{(i)} - x1_t)(x1_t^{(i)} - x1_t)] & E[(x1_t^{(i)} - x1_t)(y1_t^{(i)} - y1_t)] \\ E[(y1_t^{(i)} - y1_t)(x1_t^{(i)} - x1_t)] & E[(y1_t^{(i)} - y1_t)(y1_t^{(i)} - y1_t)] \end{bmatrix} \quad (2)$$

In the formula, $x1_t^{(i)}$ is the x-coordinate of the i-th particle (i is a natural number, and $1 \leq i \leq M11$), which is used to estimate the internal state of the landmark LM1, and $y1_t^{(i)}$ is the y-coordinate of the i-th particle (i is a natural number, and $1 \leq i \leq M11$), which is used to estimate the internal state of the landmark LM1.

E[a] is an expected value of a. In other words, $E[(x1_t^{(i)} - x1_t)(x1_t^{(i)} - x1_t)]$ is a variance of the x-coordinates of the M11 particles (M11 is a natural number) for estimating the internal state of the landmark LM1. $E[(y1_t^{(i)} - y1_t)(y1_t^{(i)} - y1_t)]$ is a variance of the y-coordinates of the M11 particles (M11 is a natural number) for estimating the internal state of the landmark LM1.

Further, $x1_t$ is an expected value (average value) of the x-coordinates of the M11 particles (M11 is a natural number) for estimating the internal state of the landmark LM1, and $y1_t$ is an expected value (average value) of the y-coordinates of the M11 particles (M11 is a natural number) for estimating the internal state of the landmark LM1.

Variance-covariance matrix data $V\_mtx_t$ (LM2) of the landmark LM2 at time t is used as the data indicating the information about the landmark LM2 (internal state of the landmark LM2). More specifically, the variance-covariance matrix data $V\_mtx_t$ (LM2) of the landmark LM2 at time t is written using the formula below.

Formula 3

$$V\_mtx_t(LM2) = \begin{bmatrix} E[(x2_t^{(i)} - x2_t)(x2_t^{(i)} - x2_t)] & E[(x2_t^{(i)} - x2_t)(y2_t^{(i)} - y2_t)] \\ E[(y2_t^{(i)} - y2_t)(x2_t^{(i)} - x2_t)] & E[(y2_t^{(i)} - y2_t)(y2_t^{(i)} - y2_t)] \end{bmatrix} \quad (3)$$

In the formula, $x2_t^{(i)}$ is the x-coordinate of the i-th particle (i is a natural number, and $1 \leq i\ M12$), which is used to estimate the internal state of the landmark LM2, and $y2_t^{(i)}$ is the y-coordinate of the i-th particle (i is a natural number, and $1 \leq i \leq M12$), which is used to estimate the internal state of the landmark LM2.

E[a] is an expected value of a. In other words, $E[(x2_t^{(i)}-x2_t)(x2_t^{(i)}-x2_t)]$ is a variance of the x-coordinates of the M12 particles (M12 is a natural number) for estimating the internal state of the landmark LM2. $E[(y2_t^{(i)}-y2_t)(y2_t^{(i)}-y2_t)]$ is a variance of the y-coordinates of the M12 particles (M12 is a natural number) for estimating the internal state of the landmark LM2.

Further, $x2_t$ is an expected value (average value) of the x-coordinates of the M12 particles (M12 is a natural number) for estimating the internal state of the landmark LM2, and $y2_t$ is an expected value (average value) of the y-coordinates of the M12 particles (M12 is a natural number) for estimating the internal state of the landmark LM2.

As described above, the moving object controller 1000 generates environmental map data $m_t$ at time t using the information about landmarks (internal state data corresponding to the positions of the landmarks and variance-covariance matrix data).

1.2.3 Details of Processing

The processing of the moving object controller 1000 will now be described in detail.

Processing at Time t−1

At time t−1, the robot Rbt1 and the landmarks LM1 and LM2 are arranged as shown in FIG. 2. Internal state data $X_{t-1}$ of the robot Rbt1 and environmental map data $m_{t-1}$ obtained by the state estimation unit 3 included in the moving object controller 1000 at time t−1 are written below.

Internal State Data $X_{t-1}$ of the Robot Rbt1

$$X_{t-1}=[XP_{t-1}, V\_mtx_{t-1}(Rbt1)]$$

$$XP_{t-1}=(x0_{t-1}, y0_{t-1}, \theta_{t-1})$$

Environmental Map Data $m_{t-1}$ $$m_{t-1}=[LM1P_{t-1}, V\_mtx_{t-1}(LM1), LM2P_{t-1}, V\_mtx_{t-1}(LM2)]$$

$$LM1P_{t-1}=(x1_{t-1}, y1_{t-1})$$

$$LM2P_{t-1}=(x2_{t-1}, y2_{t-1})$$

The internal state data $X_{t-1}$ and the environmental map data $m_{t-1}$ obtained by the state estimation unit 3 included in the moving object controller 1000 at time t−1 are stored into the storage unit 4.

At time t−1, control input data $U_{t-1}$ is input into the moving object controller 1000. The control input data $U_{t-1}$ is used to move the robot Rbt1 in the direction of arrow Dir1 shown in FIG. 2. More specifically, the control input data $U_{t-1}$ is written as $$U_{t-1}=(Vx_{t-1}, Vy_{t-1}), \text{ and}$$

$$\theta_{t-1}=\tan^{-1}(-Vy_{t-1}/Vx_{t-1}),$$

where $Vx_{t-1}$ is the speed in x-direction and $Vy_{t-1}$ is the speed in y-direction.

When controlled using the control input data $U_{t-1}$, the robot Rbt1 is predicted to move to the position shown in FIG. 3 at time t. The distance between the point $(x0_{t-1}, y0_{t-1})$ in FIG. 2 and the point $(x0_t, y0_t)$ in FIG. 3 is the distance (estimated distance) by which the robot Rbt1 moves from time t−1 to time t at speed $Vx_{t-1}$ in x-direction and at speed $Vy_{t-1}$ in y-direction.

The imaging device (not shown) mounted on the robot Rbt1 incorporates an optical system with an optical axis extending in the direction of arrow Dir shown in FIG. 2. The imaging device captures an image around the robot Rbt1 at an angle α shown in FIG. 2. The imaging device in the robot Rbt1 captures an image of an area AR_cap$_{t-1}$ indicated by broken lines in FIG. 2 at time t−1.

Figure 5:
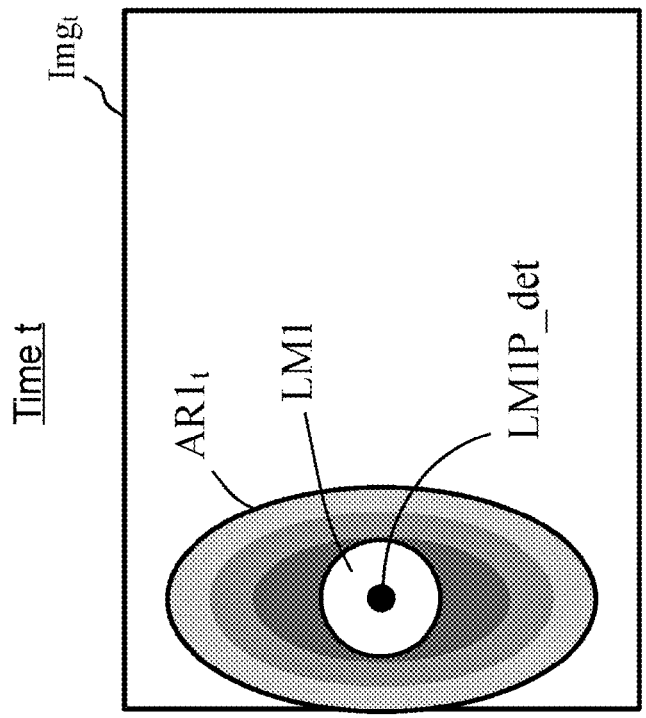
FIG. 5 is a schematic diagram showing an image D1 at time t−1 (image $Img_{t-1}$) and the image D1 at time t (image $Img_t$).
Figure 5:
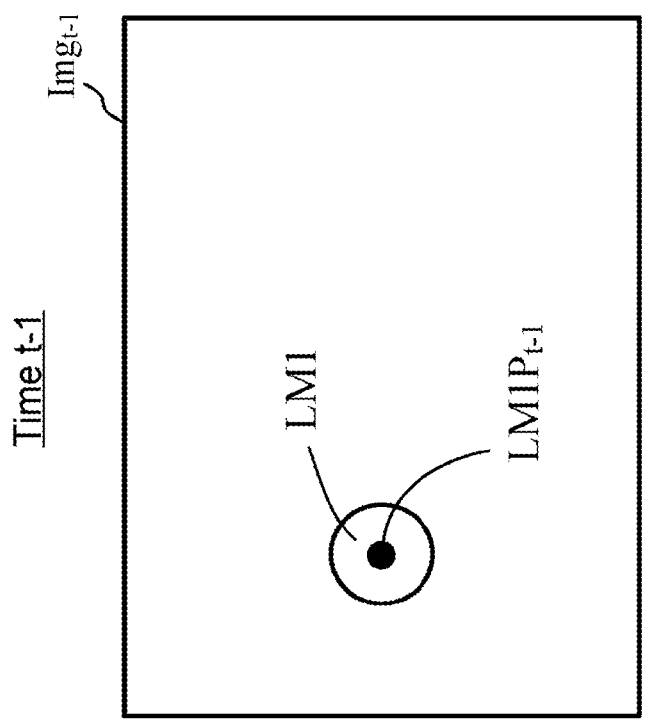

The left part of FIG. 5 schematically shows an image Img$_{t-1}$ captured by the imaging device in the robot Rbt1 at time t−1. As shown in the left part of FIG. 5, the captured image includes a circular landmark LM1. In the left part of FIG. 5, a point corresponding to the internal state data LM1P$_{t-1}$=y1$_{t-1}$) for the position of the landmark LM1 at time t−1 is depicted as a black dot.

Processing at Time t

At time t, the robot Rbt1 controlled using the control input $U_{t-1}$ is predicted to have moved to the position shown in FIG. 3.

At time t, an image captured by the imaging device in the robot Rbt1 is input into the observation obtaining unit 1 as input data Din.

The observation obtaining unit 1 subjects the input data Din to camera signal processing (e.g., gain adjustment, gamma correction, and white balance adjustment), and outputs the resultant image signal D1 (image D1) to the landmark detection unit 2 as observation data.

The landmark prediction unit 5 obtains data $ST_{t-1}$ at time t−1 from the storage unit 4.

The data $ST_{t-1}$ includes (1) the internal state data $X_{t-1}$ of the robot Rbt1 at time t−1, (2) the environmental map data $m_{t-1}$ at time t−1, and (3) the control input data $U_{t-1}$ for the robot Rbt1 at time t−1.

The landmark prediction unit 5 predicts the information about the landmark at time t based on the data $ST_{t-1}$ at time t−1.

More specifically, the landmark prediction unit 5 predicts a position at which the landmark is likely to be in the image D1. Based on the control input data $U_{t-1}$ at time t−1 used to control the robot Rbt1, the robot Rbt1 is likely to be at the position shown in FIG. 3 at time t, and an area AR_cap$_t$ defined by broken lines in FIG. 3 is likely to be captured by the imaging device in the robot Rbt1 at time t. The image (image D1) captured by the imaging device in the robot Rbt1 is likely to contain the landmark LM1. The area of the image D1 that is likely to contain the landmark LM1 can be calculated based on (1) the internal state data $X_{t-1}$ of the robot Rbt1 at time t−1, (2) the environmental map data $m_{t-1}$ at time t−1 (positional information about the landmark LM1 at time t−1), and (3) the control input data $U_{t-1}$ for the robot Rbt1 at time t−1.

The right part of FIG. 5 shows the obtained image area AR1$_t$ (one example) that is likely to contain the calculated landmark LM1.

The right part of FIG. 5 schematically shows an image area AR1$_t$ of the image D1 (image shown as Img$_t$ in FIG. 5) that is likely to contain the landmark LM1.

The landmark prediction unit 5 outputs a signal containing (1) information indicating that the landmark LM1 is solely likely to be contained in the image D1 at time t and (2) information for identifying the image area AR1$_t$ that is likely to contain the landmark LM1, calculated through the above processing, to the landmark detection unit 2 as a landmark prediction signal Sig_pre.

For ease of explanation, the image area AR1$_t$ is elliptical as shown in the right part of FIG. 5. The landmark LM1 is likely to be detected at the center of the elliptical image area AR1$_t$, and is less likely to be detected at positions more away from the center of the elliptical image area AR1$_t$.

The size of the image area AR1$_t$ is set based on, for example, the positional information about the landmark LM1 included in the environmental map data $m_{t-1}$ at time t−1 and/or the variance-covariance matrix data of the landmark LM1. The size of the image area $AR1_t$ may be fixed to a predetermined size to simplify the processing. The same applies to the size of an image area $ARk_t$ for the k-th landmark (k is a natural number).

The landmark detection unit 2 determines that the landmark LM1 is solely likely to be contained in the image D1 at time t based on the landmark prediction signal Sig_pre, which is provided from the landmark prediction unit 5. The landmark detection unit 2 also performs processing to detect the landmark LM1 using the image area $AR1_t$ that is likely to contain the landmark LM1.

As shown in the right part of FIG. 5, the landmark LM1 is at the position indicated by LM1 in the image D1 (image $Img_t$). The landmark detection unit 2 starts searching for the landmark LM1 at the center of the image area $AR1_t$ and then sequentially searches for the landmark LM1 at positions away from the search initial position. In the right part of FIG. 5, the landmark LM1 is near the center of the image area $AR1_t$. In this case, the landmark detection unit 2 detects the landmark LM1 immediately after starting the search for the landmark LM1 from the center of the image area $AR1_t$. Each landmark may be provided with landmark identification information (marker), such as a pattern, a color, or a character indicating a specific code. In this case, the landmark detection unit 2 can detect a specific landmark by detecting its landmark identification information (marker) in the image D1 (image $Img_t$) (identify a detected landmark).

The landmark detection unit 2 obtains the position (coordinate on the x-y plane shown in FIGS. 2 and 3) and the size of the landmark LM1 in the environmental map based on the position and the size of the landmark LM1 in the image D1 (image $Img_t$) detected through the processing described above and the imaging parameters (including the viewing angle and the focal length) obtained when the image D1 (image $Img_t$) is captured. The landmark detection unit 2 then outputs a signal containing information for identifying the position and the size of the landmark LM1 in the environmental map to the state update unit 31 and the environmental map update unit 32 included in the state estimation unit 3 as a landmark detection signal $LM_t$.

The state update unit 31 included in the state estimation unit 3 estimates the internal state of the robot Rbt1 using the observation data D1, which is output from the observation obtaining unit 1, the landmark detection signal $LM_t$, which is output from the landmark detection unit 2, and the control input data Ut for the moving object (robot Rbt1). The state update unit 31 obtains the estimation result as internal state data $X_t$ of the robot Rbt1 at the current time t (updates the internal state data).

The state update unit 31 obtains (updates) the internal state data $X_t$ at the current time t through particle filtering. More specifically, the state update unit 31 uses the posterior probability distribution of the state vector $XP_{t-1}$ at time t−1 as the prior probability distribution of the state vector $XP_t$ at the current time t, and obtains the predictive probability distribution of the state vector $XP_t$ at the current time t through prediction using the prior probability distribution of the state vector $XP_t$ at the current time t. The state update unit 31 then calculates a likelihood based on the obtained predictive probability distribution and actual observation data (observation data at the current time t). At the ratio proportional to the calculated likelihood, the state update unit 31 samples particles without changing the total number of the particles. Through the processing, the internal state of the robot Rbt1 is estimated.

The actual observation data used to obtain the state vector $XP_t$ at the current time t is the data obtained based on, for example, at least one of (1) the image D1 output from the observation obtaining unit 1, (2) the information obtained from the landmark detection signal $LM_t$ for identifying the position and the size of the landmark (landmark LMk) in the environmental map, and (3) other information for identifying the position and the size of the robot Rbt1 in the environmental map (e.g., information obtained by a position sensor mounted on the robot Rbt1).

The state update unit 31 obtains variance-covariance matrix data $V\_mtx_t$(Rbt1) of the robot Rbt1 at time t as the data indicating the internal state of the robot Rbt1. FIGS. 2 to 4 each schematically show an ellipse containing most of the particles for obtaining the internal state corresponding to the position of the robot Rbt1. This ellipse is shaped and sized based on the values of the elements of the variance-covariance matrix and/or values calculated using the values of such matrix elements. More specifically, the ellipse shown in FIGS. 2 to 4 indicates the uncertainty of the internal state data corresponding to the position of the robot Rbt1. A smaller ellipse indicates that the position of the robot Rbt1 is estimated with higher accuracy.

As described above, the internal state data $X_t$ of the robot Rbt1 at time t obtained by the state update unit 31 is output out of the state estimation unit 3, and also to the storage unit 4.

The environmental map update unit 32 included in the state estimation unit 3 estimates the internal state corresponding to the position of a landmark based on a landmark detection signal $LM_t$, which is output from the landmark detection unit 2. The environmental map update unit 32 then obtains environmental map data $m_t$ at time t based on the estimation result. The processing for the landmark LM1 will now be described.

The environmental map update unit 32 obtains (updates) internal state data $LM1P_t$ corresponding to the position of the landmark LM1 at the current time t through particle filtering. More specifically, the environmental map update unit 32 uses the posterior probability distribution of the internal state data $LM1P_{t-1}$ corresponding to the position of the landmark LM1 at time t−1 as the prior probability distribution of the internal state data $LM1P_t$ corresponding to the position of the landmark LM1 at the current time t, and obtains the predictive probability distribution of the internal state data $LM1P_t$ corresponding to the position of the landmark LM1 at the current time t through prediction using the prior probability distribution of the internal state data $LM1P_t$ corresponding to the position of the landmark LM1 at the current time t. The environmental map update unit 32 then calculates a likelihood based on the obtained predictive probability distribution and actual observation data (observation data at the current time t). At the ratio proportional to the calculated likelihood, the environmental map update unit 32 samples particles without changing the total number of the particles. Through the processing, the internal state corresponding to the position of the landmark LM1 is estimated.

The actual observation data used to obtain the internal state data $LM1P_t$ corresponding to the position of the landmark LM1 at the current time t is the data obtained based on, for example, information for identifying the position and the size of the landmark LM1 in the environmental map obtained based on the landmark detection signal $LM_t$.

The environmental map update unit 32 obtains variance-covariance matrix data $V\_mtx_t$(LM1) of the landmark LM1 at time t as the data indicating the internal state corresponding to the position of the landmark LM1. FIGS. 2 to 4 each schematically show an ellipse containing most of the particles for obtaining the internal state corresponding to the position of the landmark LM1. This ellipse is shaped and sized based on the values of the elements of the variance-covariance matrix data and/or values calculated using the values of such matrix elements. More specifically, the ellipse shown in FIGS. 2 to 4 indicates the uncertainty of the internal state data corresponding to the position of the landmark LM1. A smaller ellipse indicates that the position of the landmark LM1 is estimated with higher accuracy.

The environmental map update unit 32 obtains internal state data LM2P$_t$ corresponding to the position of the landmark LM2 and variance-covariance matrix data V_mtx$_t$ (LM2) with the same procedure described above.

The environmental map update unit 32 obtains (updates) the environmental map data m$_t$ at time t based on the data obtained through the processing described above. The environmental map data m$_1$ obtained by the environmental map update unit 32 is then output out of the state estimation unit 3, and also to the storage unit 4.

Processing at Time t+1 and Subsequent Times

The processing described above will be repeated at time t+1 and subsequent times.

Through the processing described above, the moving object controller 1000 can continuously obtain (1) environmental map data m$_t$ and (2) internal state data X$_t$ of the robot Rbt1 with high accuracy. This highly accurate data is used to control the robot Rbt1 in an appropriate manner.

As described above, the moving object controller 1000 includes the landmark prediction unit that searches for a predetermined landmark by predicting an image area that is likely to contain the predetermined landmark in an image D1 of observation data at time t based on (1) internal state data X$_{t-1}$ of the robot Rbt1 at time t−1, (2) environmental map data m$_{t-1}$ at time t−1, and (3) control input data U$_{t-1}$ used to control the robot Rbt1 at time t−1. The moving object controller 1000 may not search the entire image D1 for the predetermined landmark, unlike such techniques known in the art. The moving object controller 1000 greatly shortens the processing time taken to detect the predetermined landmark and thus shortens the processing time taken to generate (update) environmental map data. Through the processing described above, the moving object controller 1000 generates an environmental map efficiently and performs highly accurate state estimation in a short time. As a result, the moving object controller 1000 controls a moving object in an appropriate manner.

In the example described above, the landmark prediction unit predicts information about a landmark at time t based on the data ST$_{t-1}$ at time t−1, which precedes the current time t by one time. The landmark prediction unit may predict information about the landmark at time t based on a plurality of sets of past data obtained before the current time t (e.g., data ST$_{t-1}$, data ST$_{t-2}$, and subsequent data).

Second Embodiment

A second embodiment will now be described.

In the second embodiment, the components that are the same as in the first embodiment are given the same reference numerals as those components, and will not be described in detail.

2.1 Structure of Moving Object Controller

Figure 6:
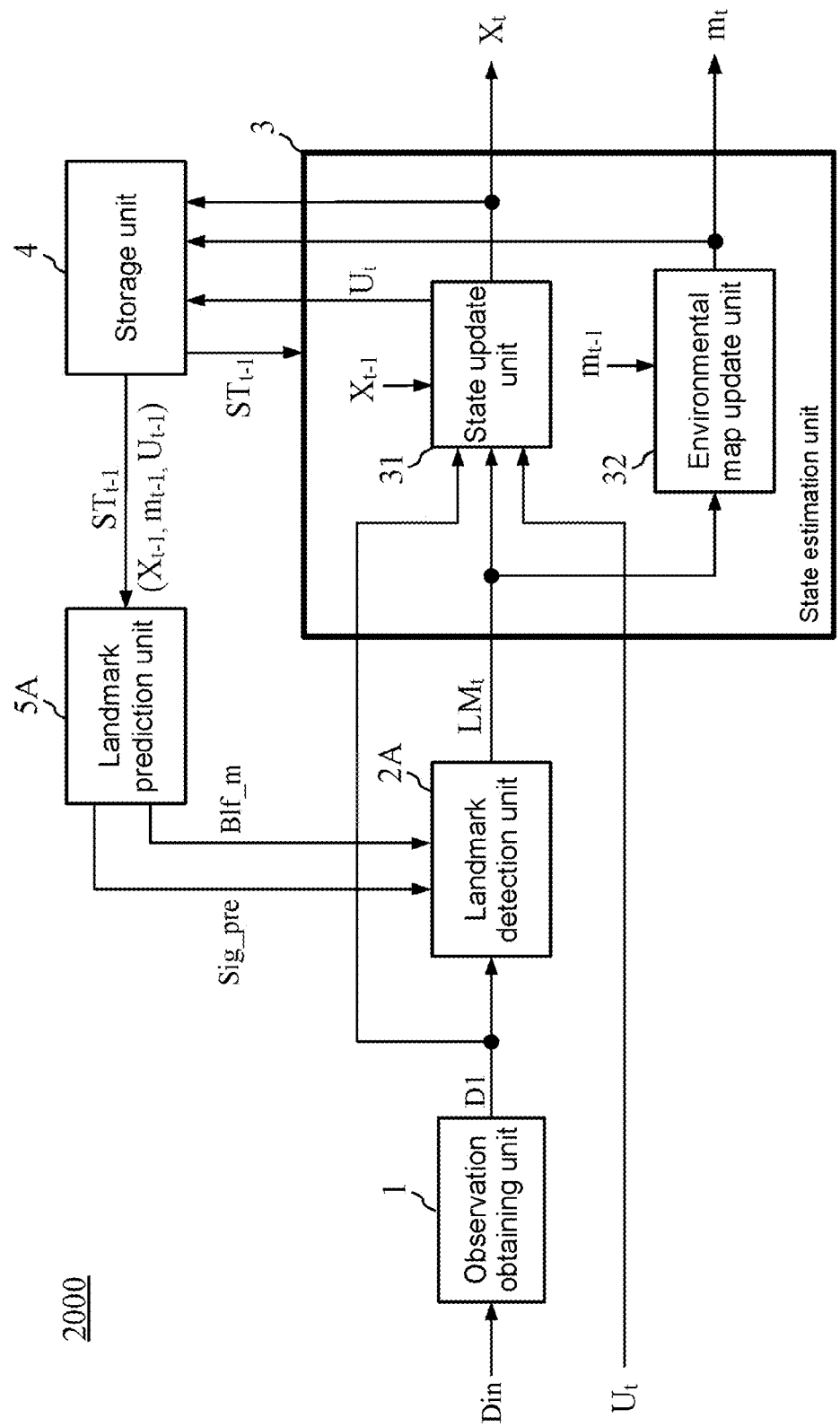
FIG. 6 is a schematic block diagram of a moving object controller 2000 according to a second embodiment.

FIG. 6 is a schematic block diagram of a moving object controller 2000 according to the second embodiment.

Figure 7:
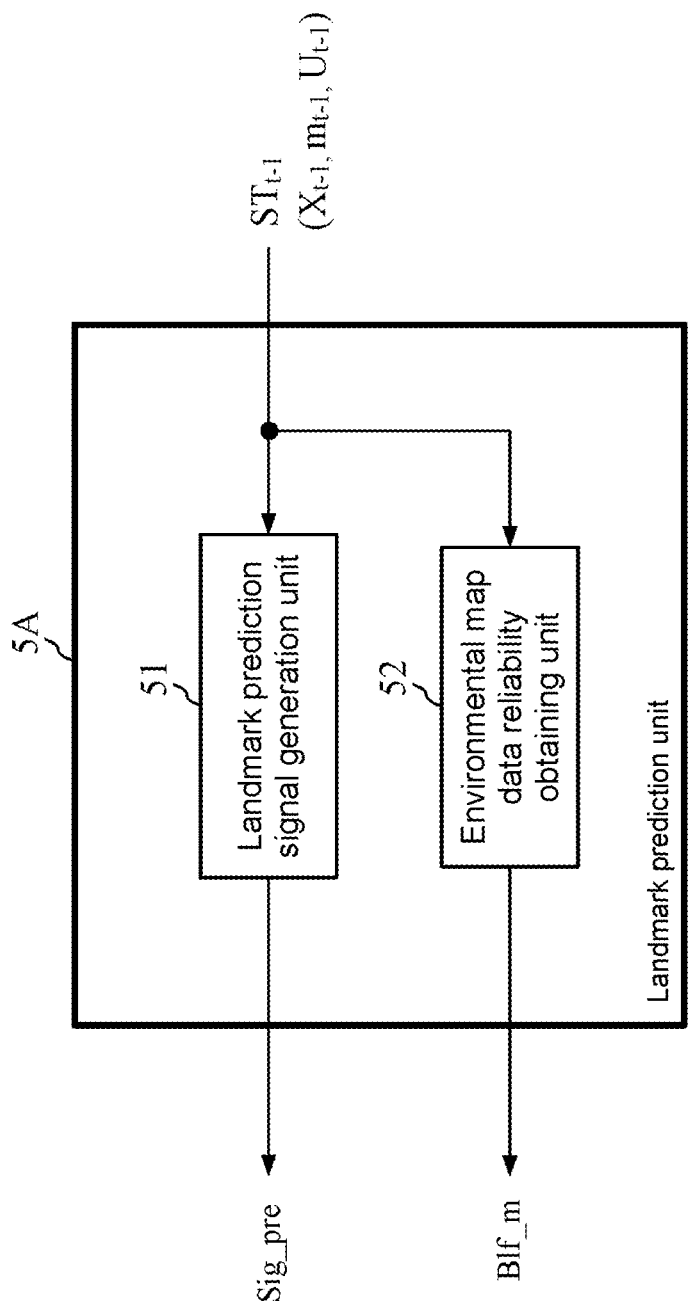
FIG. 7 is a schematic block diagram of a landmark prediction unit 5A in the second embodiment.

FIG. 7 is a schematic block diagram of a landmark prediction unit 5A in the second embodiment.

Figure 8:
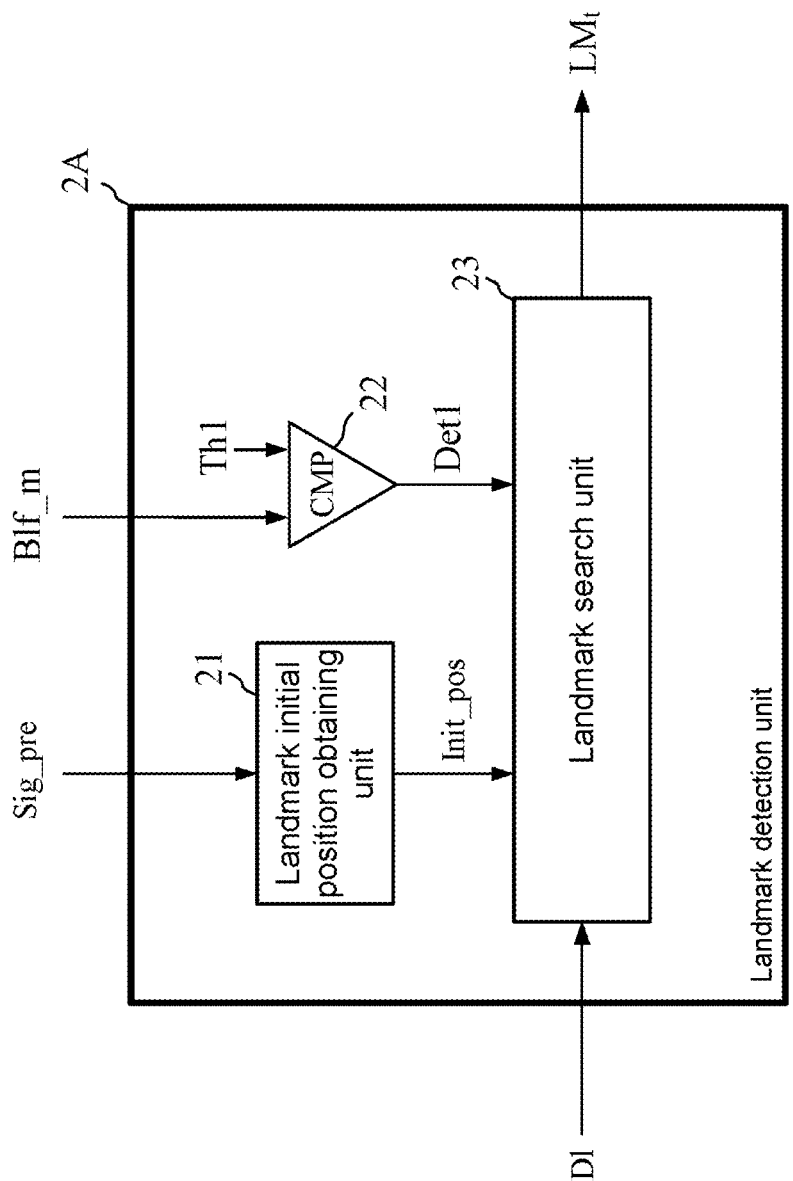
FIG. 8 is a schematic block diagram of a landmark detection unit 2A in the second embodiment.

FIG. 8 is a schematic block diagram of a landmark detection unit 2A in the second embodiment.

The moving object controller 2000 according to the second embodiment includes a landmark detection unit 2A, which replaces the landmark detection unit 2 included in the moving object controller 1000 of the first embodiment, and a landmark prediction unit 5A, which replaces the landmark prediction unit 5.

As shown in FIG. 7, the landmark detection unit 2A includes a landmark prediction signal generation unit 51 and an environmental map data reliability obtaining unit 52.

The landmark prediction signal generation unit 51 receives data ST$_{t-1}$ at time t−1, which is read from the storage unit 4. The landmark prediction signal generation unit 51 generates a landmark prediction signal Sig_pre based on the data ST$_{t-1}$, and outputs the generated landmark prediction signal Sig_pre to the landmark detection unit 2A.

The environmental map data reliability obtaining unit 52 receives data ST$_{t-1}$ at time t−1, which is read from the storage unit 4. The environmental map data reliability obtaining unit 52 obtains reliability Blf_m of information about each landmark based on environmental map data m$_{t-1}$, and outputs the obtained reliability Blf_m of the information about each landmark to the landmark detection unit 2A. The reliability Blf_m is obtained for each landmark. For example, reliability Blf_m (LM1) of a landmark LM1 is a sum of diagonal elements of the variance-covariance matrix data V_mtx$_{t-1}$ (LM1) of the landmark LM1. In other words, the reliability Blf_m (LM1) is a sum of the variance of the x-coordinate of the landmark LM1 at time t−1 and the variance of the y-coordinate of the landmark LM1 at time t−1. The reliability Blf_m (LMk) of the landmark LMk may be calculated with any other method that can yield a value representing the estimation accuracy of the landmark position.

As shown in FIG. 8, the landmark detection unit 2A includes a landmark initial position obtaining unit 21, a first comparator 22, and a landmark search unit 23.

The landmark initial position obtaining unit 21 receives a landmark prediction signal Sig_pre, which is output from the landmark prediction unit 5A. The landmark initial position obtaining unit 21 obtains information for setting an image area that is likely to contain each landmark in an image D1 based on the landmark prediction signal Sig_pre. Using the obtained information, the landmark initial position obtaining unit 21 then determines the initial position (in the image) at which the search for each landmark is to be started in the image D1. The landmark initial position obtaining unit 21 outputs information Init_pos about the initial position in the search for each landmark to the landmark search unit 23.

The first comparator 22 receives reliability Blf_m of information about each landmark, which is output from the landmark prediction unit 5A, and a threshold value Th1. The first comparator 22 compares the reliability Blf_m and the threshold value Th1, and outputs a signal Det1 indicating the comparison result to the landmark search unit 23.

The landmark search unit 23 receives the information Init_pos about the initial position at which the search for each landmark is started, which is output from the landmark initial position obtaining unit 21, and the signal Det1 indicating the comparison result, which is output from the first comparator 22. Using the signal Det1 indicating the comparison result, the landmark search unit 23 performs (1) local search or (2) global search for each landmark to obtain the position (coordinate position on the x-y plane shown in FIGS. 2 and 3) and the size of each landmark in the environmental map. The landmark search unit 23 then outputs a signal indicating the obtained information for identifying the position and the size of each landmark in the environmental map to the state update unit 31 and the environmental map update unit 32 included in the state estimation unit 3 as a landmark detection signal $LM_t$.

2.2 Operation of Moving Object Controller

The operation of the moving object controller 2000 with the above-described structure will now be described. The processing that is the same as the processing described in the first embodiment will not be described.

The landmark prediction signal generation unit 51 generates a landmark prediction signal Sig_pre based on the data $ST_{t-1}$ read from the storage unit 4. The landmark prediction signal generation unit 51 then outputs the generated landmark prediction signal Sig_pre to the landmark initial position obtaining unit 21 included in the landmark detection unit 2A.

The environmental map data reliability obtaining unit 52 obtains reliability Blf_m of information about each landmark based on environmental map data $m_{t-1}$ at time t−1 read from the storage unit 4. The environmental map data reliability obtaining unit 52 then outputs the obtained reliability Blf_m of the information about each landmark to the first comparator 22 of the landmark detection unit 2A.

The environmental map data reliability obtaining unit 52 obtains (1) reliability Blf_m (LM1) of the landmark LM1 based on the sum of diagonal elements of the variance-covariance matrix data $V\_mtx_{t-1}$ (LM1) of the landmark LM1, and (2) reliability Blf_m (LM2) of the landmark LM2 based on the sum of diagonal elements of the variance-covariance matrix data $V\_mtx_{t-1}$ (LM2) of the landmark LM2.

For ease of explanation, the environmental map data in the present embodiment also includes the two landmarks LM1 and LM2.

The landmark initial position obtaining unit 21 included in the landmark detection unit 2A obtains information for setting an image area that is likely to contain each landmark in the image D1 based on a landmark prediction signal Sig_pre, which is output from the landmark prediction unit 5A. Using the obtained information, the landmark initial position obtaining unit 21 then determines the initial position (in the image) at which the search for each landmark is to be started in the image D1. The landmark initial position obtaining unit 21 outputs the determined information Init_pos about the initial position in the search for each landmark to the landmark search unit 23.

The first comparator 22 receives reliability Blf_m of information about each landmark, which is output from the landmark prediction unit 5A, and a threshold value Th1. The first comparator 22 then compares the reliability Blf_m and the threshold value Th1.

More specifically, the processing described below is performed.

(A) The reliability Blf_m (LM1) of the landmark LM1 is compared with the threshold Th1.

(A1) When Blf_m (LM1)<Th1, the signal Det1 is set to Det1 (LM1)=1.

(A2) When Blf_m (LM1)≥Th1, the signal Det1 is set to Det1 (LM1)=0.

(B) The reliability Blf_m (LM2) of the landmark LM2 is compared with the threshold Th1.

(B1) When Blf_m (LM2)<Th1, the signal Det1 is set to Det1 (LM2)=1.

(B2) When Blf_m (LM2)≥Th1, the signal Det1 is set to Det1 (LM2)=0.

The resultant signal Det1 indicating the detection result for each landmark is output from the first comparator 22 to the landmark search unit 23.

The landmark search unit 23 receives information Init_pos indicating the search initial position for each landmark from the landmark initial position obtaining unit 21 and the signal Det1 indicating the comparison result from the first comparator 22, and determines whether (1) local search or (2) global search is to be performed for each landmark using the received information and the received signal.

More specifically, the landmark search unit 23 performs the processing (A1), (A2), (B1), and (B2) described below.

(A1) When Det1 (LM1)=1, indicating the estimation result with high reliability for the landmark LM1, local search is to be performed for the landmark LM1. The local search refers to setting an image area $ARk_t$ that is likely to contain the landmark LMk (k is a natural number) and searching the set image area $ARk_t$ to detect the landmark LMk (k is a natural number) as described in the first embodiment.

(A2) When Det1 (LM1)=0, indicating the estimation result with low reliability for the landmark LM1, global search is to be performed for the landmark LM1. The global search refers to searching the entire area of the image D1 to detect the landmark LMk (k is a natural number).

(B1) When Det1 (LM2)=1, indicating the estimation result with high reliability for the landmark LM2, the local search is to be performed for the landmark LM2.

(B2) When Det1 (LM2)=0, indicating the estimation result with low reliability for the landmark LM2, the global search is to be performed for the landmark LM2.

The landmark search unit 23 obtains the size and the position (coordinates on the x-y plane shown in FIGS. 2 and 3) of each of the landmarks LM1 and LM2 in the environmental map based on the search result obtained through the processing above as described in the first embodiment. The landmark search unit 23 then outputs a landmark detection signal $LM_t$ containing the obtained information for identifying the size and the position of the landmarks LM1 and LM2 in the environmental map to the state update unit 31 and the environmental map update unit 32 included in the state estimation unit 3.

As described above, the moving object controller 2000 selectively switches the processing for detecting a landmark between the local search and the global search based on the reliability of information about the landmark. The moving object controller 2000 can thus detect a landmark at high speed when the information about the landmark has high reliability. When the information about the landmark has low reliability, the global search is performed to increase the probability that the landmark can be detected.

First Modification

A first modification of the second embodiment will now be described.

In the present modification, the components that are the same as in the above embodiments are given the same reference numerals as those components, and will not be described in detail.

Figure 9:
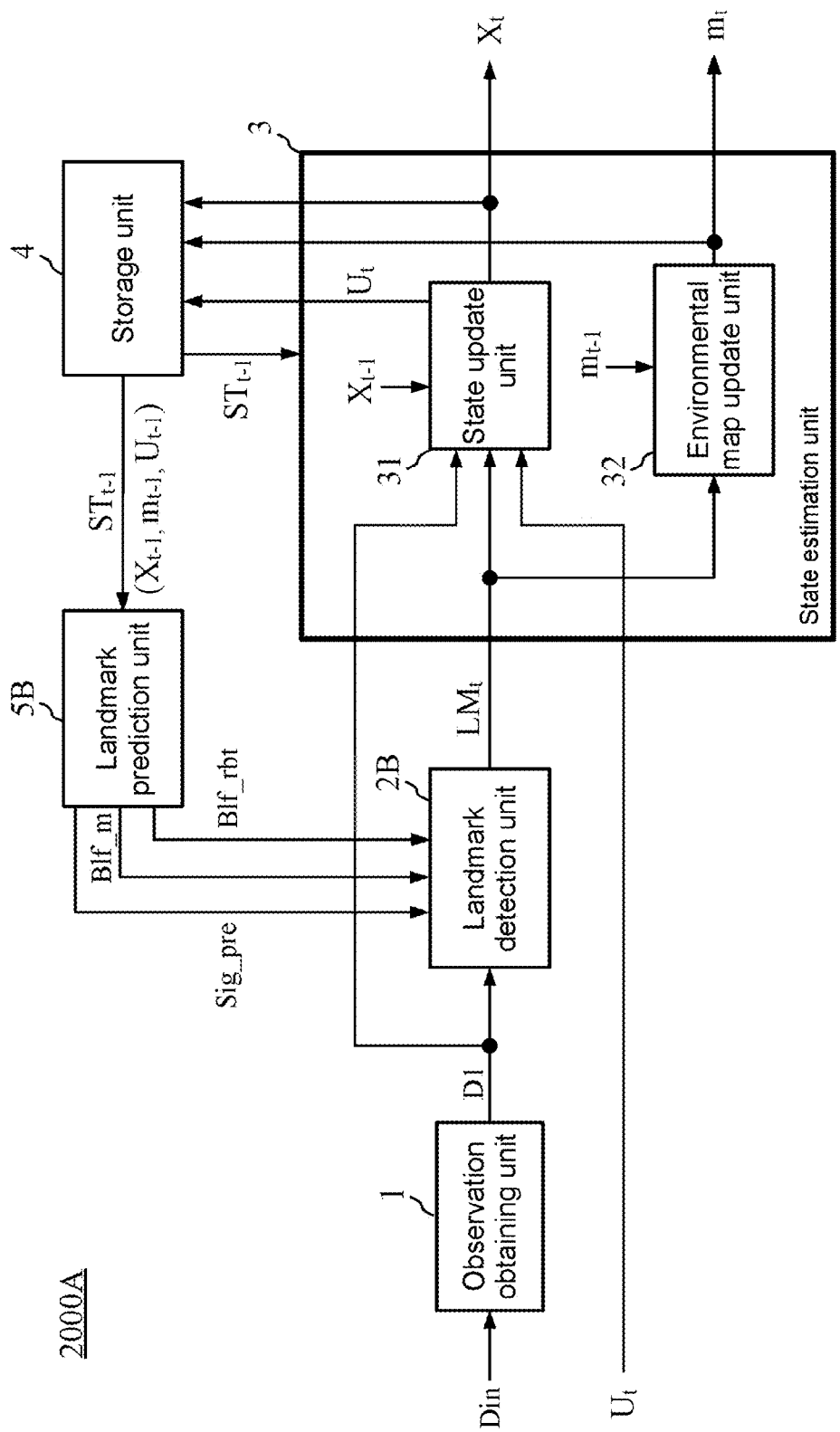
FIG. 9 is a schematic block diagram of a moving object controller 2000A according to a first modification of the second embodiment.

FIG. 9 is a schematic block diagram of a moving object controller 2000A according to a first modification of the second embodiment.

Figure 10:
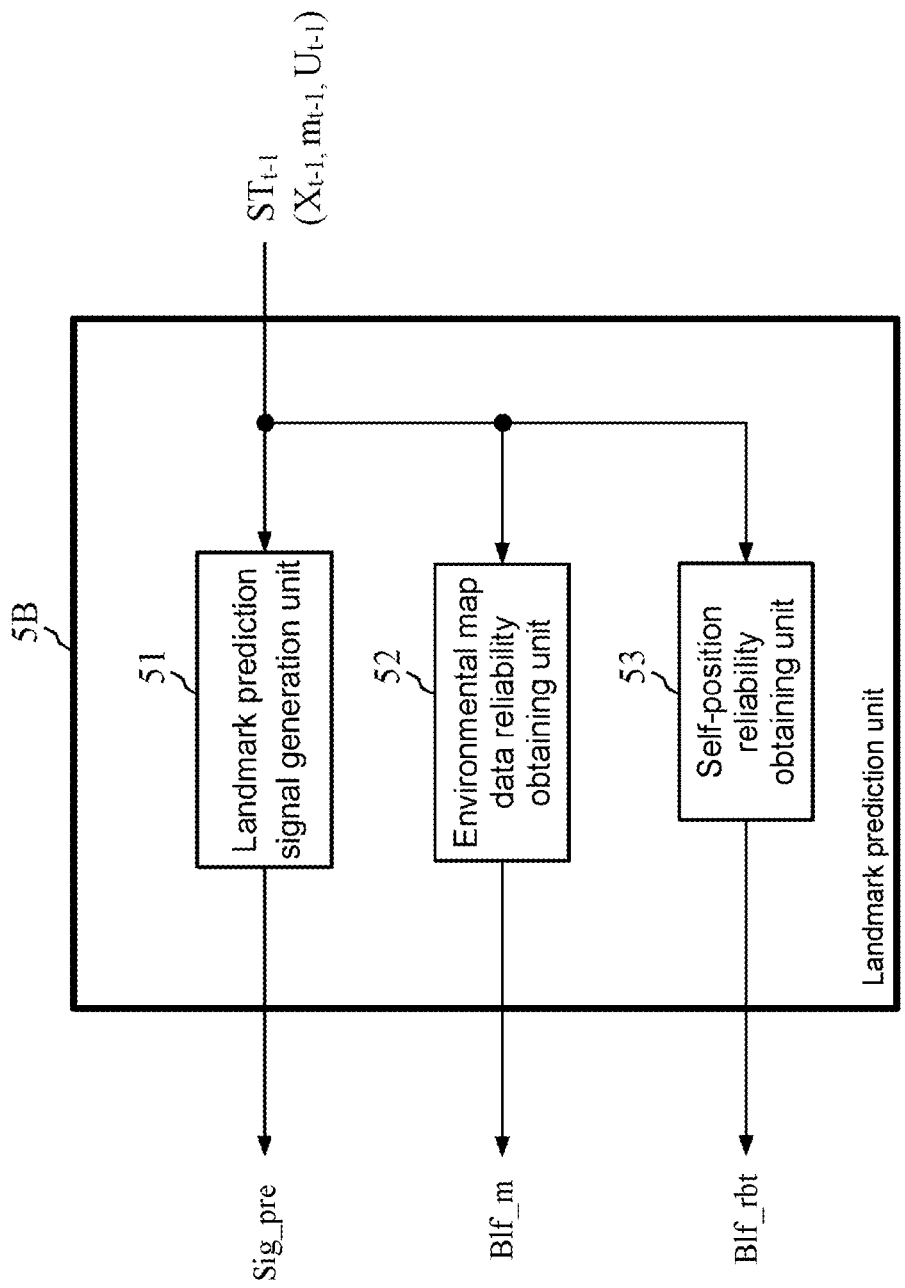
FIG. 10 is a schematic block diagram of a landmark prediction unit 5B in the first modification of the second embodiment.

FIG. 10 is a schematic block diagram of a landmark prediction unit 5B in the first modification of the second embodiment.

Figure 11:
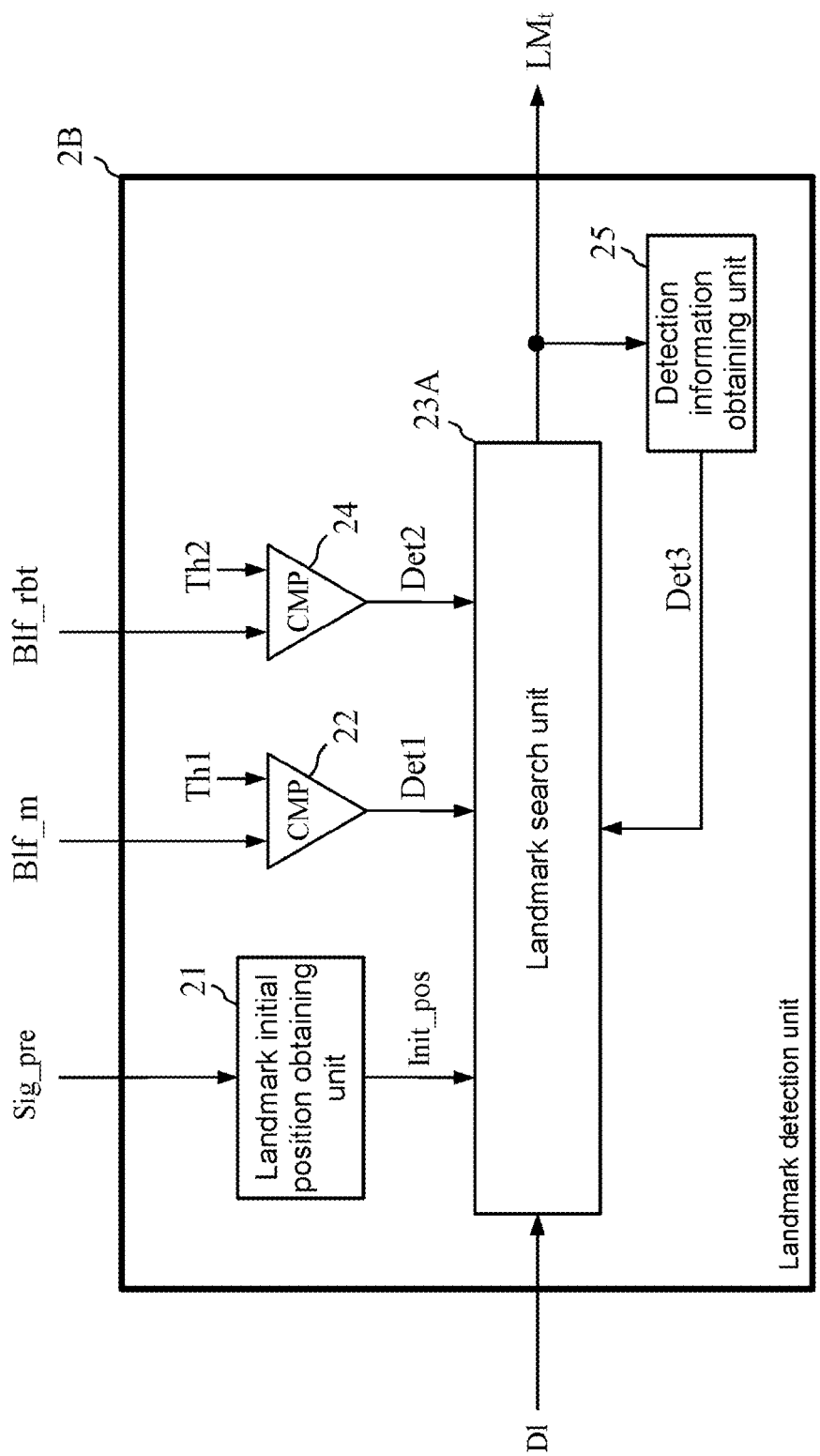
FIG. 11 is a schematic block diagram of a landmark detection unit 2B in the first modification of the second embodiment.

FIG. 11 is a schematic block diagram of a landmark detection unit 2B in the first modification of the second embodiment.

The moving object controller 2000B according to the present modification includes a landmark detection unit 2B, which replaces the landmark detection unit 2A included in the moving object controller 2000 of the second embodiment, and a landmark prediction unit 5B, which replaces the landmark prediction unit 5A.

As shown in FIG. 10, the landmark prediction unit 5B includes a self-position reliability obtaining unit 53, which is added to the structure of the landmark prediction unit 5A.

The self-position reliability obtaining unit 53 receives data $ST_{t-1}$ at time t−1, which is read from the storage unit 4. The self-position reliability obtaining unit 53 obtains reliability Blf_rbt of internal state data of the robot Rbt1 based on the internal state data $X_{t-1}$ of the robot Rbt1, and outputs the obtained reliability Blf_rbt of the internal state data of the robot Rbt1 to the landmark detection unit 2B. The reliability Blf_rbt is, for example, a sum of diagonal elements of the variance-covariance matrix data $V\_mtx_{t-1}$ (Rbt1) of the robot Rbt1. In other words, the reliability Blf_rbt is a sum of the variance of the x-coordinate of the robot Rbt1 at time t−1 and the variance of the y-coordinate of the robot Rbt1 at time t−1. The reliability Blf_rbt of the robot Rbt1 may be calculated with any other method that can yield a value representing the estimation accuracy of the internal state data of the robot Rbt1.

As shown in FIG. 11, the landmark detection unit 2B includes a landmark search unit 23A, which replaces the landmark search unit 23 included in the landmark detection unit 2A, and a second comparator 24 and a detection information obtaining unit 25, which are added to the structure of the landmark detection unit 2.

The second comparator 24 receives the reliability Blf_rbt of the internal state data of the robot Rbt1, which is output from the self-position reliability obtaining unit 53 of the landmark prediction unit 5B, and a threshold value Th2. The second comparator 24 compares the reliability Blf_rbt and the threshold value Th2, and outputs a signal Det2 indicating the comparison result to the landmark search unit 23A.

The landmark search unit 23A further receives the signal Det2 indicating the comparison result, which is output from the second comparator 24, and a signal Det3 output from the detection information obtaining unit 25, in addition to the structure of the landmark search unit 23. The landmark search unit 23A then performs the same processing as the landmark search unit 23, and further determines whether local search or global search is to be performed to detect a landmark based on the signal Det2 and/or the signal Det3.

The detection information obtaining unit 25 receives a landmark detection signal $LM_t$, which is output from the landmark search unit 23A, and obtains information about the detection for each landmark based on the landmark detection signal $LM_t$. For example, the detection information obtaining unit 25 generates a signal containing the estimation accuracy of information about the number of times each landmark has been detected within a predetermined past period or the position of each landmark as a detection signal Det3. The detection information obtaining unit 25 outputs the generated detection signal Det3 to the landmark search unit 23A.

The operation of the moving object controller 2000A with the above-described structure will now be described. The processing that is the same as the processing of the moving object controller 2000 will not be described.

The self-position reliability obtaining unit 53 obtains reliability Blf_rbt of the internal state data of the robot Rbt1 based on the internal state data $X_{t-1}$ of the robot Rbt1. The self-position reliability obtaining unit 53 outputs the obtained reliability Blf_rbt of the robot Rbt1 to the second comparator 24 included in the landmark detection unit 2B.

The second comparator 24 included in the landmark detection unit 2B compares the reliability Blf_rbt of internal state data of the robot Rbt1, which is output from the self-position reliability obtaining unit 53 of the landmark prediction unit 5B, and a threshold value Th2.

More specifically, the processing described below is performed.

(1) When Blf_rbt<Th2, the signal Det2 is set to Det2=1.

(2) When Blf_rbt≥Th2, the signal Det2 is set to Det2=0.

The resultant signal Det2 indicating the comparison result is output from the second comparator 24 to the landmark search unit 23A.

The landmark search unit 23A performs the same processing as the processing performed by the landmark search unit 23 of the second embodiment, and additionally determines whether local search or global search is to be performed to detect each landmark based on the signal Det2.

More specifically, when Det2=0, the landmark search unit 23A determines that the internal state data of the robot Rbt1 has low reliability, and thus selects global search to detect each landmark. When Det2=1, the landmark search unit 23A selects local search or global search for each landmark based on the signal Det1, and performs the selected local or global search to detect each landmark in the same manner as the landmark search unit 23 according to the second embodiment.

The landmark search unit 23A may select local search or global search to detect each landmark based on the detection signal Det3.

The landmark search unit 23A can determine the estimation accuracy of information about the number of times each landmark has been detected in a predetermined past period or about the position of each landmark using the signal Det3 containing information about the landmark detection, which is output from the detection information obtaining unit 25. When the detection signal Det3 indicates that a predetermined landmark has not been retrieved (detected) in the search performed by the landmark search unit 23A for at least a predetermined period of time, the landmark search unit 23A may determine that the information about the predetermined landmark has low reliability, and may select global search for this landmark and perform the global search to detect the landmark.

In the moving object controller 2000A according to this modification, the detection information obtaining unit 25 may be eliminated.

As described above, the moving object controller 2000A selectively switches the processing for detecting a landmark between the local search and the global search based on the reliability of information about the landmark and the internal state data of the robot Rbt1. The moving object controller 2000A can thus detect each landmark with higher accuracy.

Other Embodiments

In the above embodiments (including modifications), the environmental map data is generated using the x-y coordinate system as shown in FIGS. 2 to 4. However, the data may be generated using another coordinate system, such as a polar coordinate system. Although the processing described in the above embodiments is performed using absolute coordinates, the processing may be performed using relative coordinates with the origin being the position of the robot Rbt1.

In the above embodiments (including modifications), the position of a moving object (robot Rbt1) and the position of each landmark are identified using two-dimensional data (the x-coordinate and the y-coordinate). However, the position of the moving object (robot Rbt1) and the position of each landmark may be identified using three-dimensional data (e.g., the x-coordinate, the y-coordinate, and the z-coordinate).

In the above embodiments (including modifications), the image area $ARk_t$ that is likely to contain the landmark LMk (k is a natural number) is an elliptical area. In some embodiments, the image area $ARk_t$ that is likely to contain the landmark LMk (k is a natural number) may be in another shape (e.g., a rectangle or a circle).

In the search for the landmark LMk, the landmark detection unit may terminate the search upon detecting the landmark LMk, and perform no further search of the image area $ARk_t$, which has been set as the search area. This enables search at higher speed.

In the search for the landmark LMk, the landmark detection unit may further detect an image area other than the image area $ARk_t$ that has been set as the search area when failing to detect the landmark LMk in the image area $ARk_t$.

In the above embodiments (including modifications), the variance-covariance matrix data is used to obtain the estimation accuracy of the position of the robot Rbt1 and the position of each landmark. In some embodiments, the accuracy of the position of the robot Rbt1 and the position of each landmark may be obtained with another index indicating positional variations.

In the above embodiments (including modifications), the diagonal elements of the variance-covariance matrix data (the elements corresponding to the variances of the x-coordinate and the y-coordinate) are used to obtain the estimation accuracy of the position of the robot Rbt1 and the position of each landmark. In some embodiments, selected elements of the variance-covariance matrix data or all the elements of the variance-covariance matrix data may be used to calculate a value indicating the accuracy of the position of the robot Rbt1 and the position of each landmark.

In the above embodiments (including modifications), the processing for estimating the position of the robot Rbt1 and the position of each landmark is performed using particle filtering. In some embodiments, the processing may be performed using other time-series filtering, such as Kalman filtering. In resampling of particles, Gaussian noise (noise in accordance with the Gaussian distribution) using the dynamics of random walks as the underlying assumption is added to obtain the set of particles resulting from the prediction. However, noise in accordance with a distribution other than the Gaussian distribution may be added to obtain the set of particles resulting from the prediction.

The above embodiments and modifications may be combined to form the moving object controller.

Each block of the moving object controller described in the above embodiments may be formed using a single chip with a semiconductor device, such as an LSI (large-scale integration) device, or some or all of the blocks of the moving object controller may be formed using a single chip.

Although LSI is used as the semiconductor device technology, the technology may be an integrated circuit (IC), a system LST, a super LSI, or an ultra LST depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

All or part of the processes performed by the functional blocks described in the above embodiments may be implemented using programs. All or part of the processes performed by the functional blocks described in the above embodiments may be implemented by a central processing unit (CPU) in a computer. The programs for these processes may be stored in a storage device, such as a hard disk or a ROM, and may be executed from the ROM or be read into a RAM and then executed.

The processes described in the above embodiments may be implemented by using either hardware or software (including use of an operating system (OS), middleware, or a predetermined library), or may be implemented using both software and hardware.

The processes described in the above embodiments may not be performed in the order specified in the above embodiments. The order in which the processes are performed may be changed without departing from the scope and the spirit of the invention.

The present invention may also include a computer program enabling a computer to implement the method described in the above embodiments and a computer readable recording medium on which such a program is recorded. The computer readable recording medium may be, for example, a flexible disk, a hard disk, a CD-ROM, an MO, a DVD, a DVD-ROM, a DVD-RAM, a large-capacity DVD, a next-generation DVD, or a semiconductor memory.

The computer program may not be recorded on the recording medium but may be transmitted with an electric communication line, a radio or cable communication line, or a network such as the Internet.

The term "unit" herein may include "circuitry," which may be partly or entirely implemented by using either hardware or software, or both hardware and software.

The specific structures described in the above embodiments of the present invention are mere examples, and may be changed and modified variously without departing from the scope and the spirit of the invention.

APPENDIXES

The present invention may also be expressed in the following forms.

A first aspect of the invention provides a moving object controller for controlling a moving object while performing processing for generating an environmental map expressed using information about a landmark and performing processing for estimating an internal state of the moving object. The controller includes an observation obtaining unit, a landmark prediction unit, a landmark detection unit, and a state estimation unit.

The observation obtaining unit obtains observation data from an observable event.

The landmark prediction unit generates a landmark prediction signal including predictive information about a landmark at a current time based on internal state data indicating an internal state of the moving object at a time preceding the current time and environmental map data at the time preceding the current time.

The landmark detection unit detects information about the landmark at the current time based on the landmark prediction signal generated by the landmark prediction unit, and generates a landmark detection signal indicating a result of the detection.

The state estimation unit estimates the internal state of the moving object based on the observation data obtained by the observation obtaining unit and the landmark detection signal to obtain data indicating an estimated internal state of the moving object at the current time, and estimates the environmental map based on the landmark detection signal to obtain data indicating an estimated environmental map at the current time.

In this moving object controller, the landmark prediction unit predicts information about a landmark (predictive information) using the observation data at the current time based on (1) the internal state data of the moving object at the time preceding the current time, and (2) the environmental map data at the time preceding the current time, and generates a landmark prediction signal including the predictive information. The landmark detection unit detects information about the landmark at the current time based on the landmark prediction signal generated by the landmark prediction unit. This moving object controller can thus search for each landmark efficiently. The moving object controller shortens the processing time taken to generate (update) the environmental map data. In other words, the moving object controller performs the processing described above to generate an environmental map efficiently and to perform highly accurate state estimation in a short period of time. As a result, the moving object controller controls the moving object in an appropriate manner.

A second aspect of the invention provides the moving object controller of the first aspect of the invention in which the observation data is image data obtained by the moving object capturing an environment surrounding the moving object.

The landmark prediction unit calculates a predictive image area that is predicted to contain the landmark in an image formed using the image data obtained at the current time based on the internal state data indicating the internal state of the moving object at the time preceding the current time and the environmental map data at the time preceding the current time, and generates the landmark prediction signal containing information about the calculated predictive image area.

The landmark detection unit performs local search in which the predictive image area of the image formed using the image data at the current time is searched to detect an image area corresponding to the landmark, and the local search is started at an initial position that is a pixel position included in a central area of the predictive image area calculated by the landmark prediction unit and is sequentially performed at positions away from the initial position.

In this moving object controller, the landmark prediction unit predicts an image area that is likely to contain the landmark in the image represented by the observation data at the current time (image formed using the image data) based on (1) the internal state data of the moving object at the time preceding the current time and (2) the environmental map data at the time preceding the current time, and searches for the landmark. This moving object controller may not search all the areas of the image for the landmark, unlike such techniques known in the art. The moving object controller 1000 can thus greatly shortens the processing time taken to detect each landmark. The moving object controller greatly shortens the processing time taken to generate (update) the environmental map data. In other words, the moving object controller performs the processing described above to generate an environmental map efficiently and to perform highly accurate state estimation in a short period of time. As a result, the moving object controller controls the moving object in an appropriate manner.

A third aspect of the invention provides the moving object controller of the second aspect of the invention in which the landmark prediction unit generates the landmark prediction signal including information about estimation accuracy of information about a position of the landmark obtained at the time preceding the current time.

The landmark detection unit performs global search in which the image formed using the image data at the current time is searched to detect the image area corresponding to the landmark when the estimation accuracy of the positional information about the landmark obtained at the time preceding the current time is lower than a predetermined value based on the landmark prediction signal.

The moving object controller performs global search to increase the probability that the landmark can be detected when the estimation accuracy of the positional information for the landmark is low. More specifically, this moving object controller appropriately avoids local search that may fail to detect a landmark and may take longer processing time when the estimation accuracy of the positional information about the landmark is low.

A fourth aspect of the invention provides the moving object controller of the second or third aspect of the invention in which the landmark prediction unit generates the landmark prediction signal including information about estimation accuracy of the internal state data of the moving object obtained at the time preceding the current time.

The landmark detection unit performs global search in which the image formed using the image data at the current time is searched to detect the image area corresponding to the landmark when the estimation accuracy of the internal state data of the moving object obtained at the time preceding the current time is lower than a predetermined value based on the landmark prediction signal.

The moving object controller performs global search to increase the probability that the landmark can be detected when the estimation accuracy of the internal state data of the moving object is low. More specifically, this moving object controller can appropriately avoid local search that may fail to detect a landmark and may take longer processing time when the estimation accuracy of the internal state data of the moving object is low (when the position of the moving object is not estimated in an appropriate manner).

A fifth aspect of the invention provides the moving object controller of one of the second to fourth aspects of the invention in which the landmark detection unit includes a detection information obtaining unit configured to store a value indicating the number of times the landmark has been detected in searching for the landmark within a predetermined period of time.

The landmark detection unit performs the local search when the value indicating the number of times the landmark has been detected stored in the detection information obtaining unit is greater than a predetermined value.

This moving object controller performs local search to shorten the processing time when the number of times the landmark has been detected is large, or in other words when the estimation accuracy of the positional information about the landmark is determined to be high.

A sixth aspect of the invention provides the moving object controller of one of the second to fourth aspects of the invention in which the landmark detection unit includes a detection information obtaining unit configured to store landmark detection information indicating whether the landmark has been detected in searching for the landmark within a predetermined period of time.

The landmark detection unit performs global search in which the image formed using the image data at the current time is searched to detect the image area corresponding to the landmark when the landmark has not been detected within the predetermined period of time based on the landmark detection information stored by the detection information obtaining unit.

This moving object controller performs global search to increase the probability that the landmark can be detected when the landmark has not be detected for a predetermined period of time.

A seventh aspect of the invention provides a moving object control method for controlling a moving object while performing processing for generating an environmental map expressed using information about a landmark and performing processing for estimating an internal state of the moving object.

The moving object control method includes an observation obtaining step, a landmark prediction step, a landmark detection step, and a state estimation step.

The program enabling the computer to implement the moving object control method has the same advantageous effects as the moving object controller of the first aspect of the present invention.

The observation obtaining step obtains observation data from an observable event.

The landmark prediction step generates a landmark prediction signal including predictive information about a landmark at a current time based on internal state data indicating an internal state of the moving object at a time preceding the current time and environmental map data at the time preceding the current time.

The landmark detection step detects information about the landmark at the current time based on the landmark prediction signal generated by the landmark prediction step, and generates a landmark detection signal indicating a result of the detection.

The state estimation step estimates the internal state of the moving object based on the observation data obtained by the observation obtaining step and the landmark detection signal to obtain data indicating an estimated internal state of the moving object at the current time, and estimates the environmental map based on the landmark detection signal to obtain data indicating an estimated environmental map at the current time.

An eighth aspect of the invention provides an integrated circuit used in a moving objet controller for controlling a moving object while performing processing for generating an environmental map expressed using information about a landmark and performing processing for estimating an internal state of the moving object. The integrated circuit includes an observation obtaining unit, a landmark prediction unit, a landmark detection unit, and a state estimation unit.

The observation obtaining unit obtains observation data from an observable event.

The landmark prediction unit generates a landmark prediction signal including predictive information about a landmark at a current time based on internal state data indicating an internal state of the moving object at a time preceding the current time and environmental map data at the time preceding the current time.

The landmark detection unit detects information about the landmark at the current time based on the landmark prediction signal generated by the landmark prediction unit, and generates a landmark detection signal indicating a result of the detection.

The state estimation unit estimates the internal state of the moving object based on the observation data obtained by the observation obtaining unit and the landmark detection signal to obtain data indicating an estimated internal state of the moving object at the current time, and estimates the environmental map based on the landmark detection signal to obtain data indicating an estimated environmental map at the current time.

The integrated circuit has the same advantageous effects as the moving object controller of the first aspect of the present invention.

What is claimed is:

1. A moving object controller for controlling a moving object while performing processing for generating an environmental map expressed using information about a landmark and performing processing for estimating an internal state of the moving object, the controller comprising:

observation obtaining circuitry configured to obtain observation data from an observable event, the observation data being image data obtained by the moving object capturing an environment surrounding the moving object;

landmark prediction circuitry configured to generate a landmark prediction signal including predictive information about a landmark at a current time based on internal state data indicating an internal state of the moving object at a time preceding the current time, the internal state of the moving object being obtained by using at least one of (1) a state vector indicating an internal state for a position and an angle of the moving object and (2) variance-covariance matrix data obtained based on the position of the moving object, and environmental map data at the time preceding the current time;

landmark detection circuitry configured to detect information about the landmark at the current time based on the landmark prediction signal generated by the landmark prediction circuitry, and generate a landmark detection signal indicating a result of the detection; and state estimation circuitry configured to estimate the internal state of the moving object based on the observation data obtained by the observation obtaining circuitry and the landmark detection signal to obtain data indicating an estimation internal state internal state of the moving object at the current time, and estimate the environmental map based on the landmark detection signal to obtain data indicating an estimation environmental map at the current time.

2. The moving object controller according to claim 1, wherein the landmark prediction circuitry calculates a predictive image area that is predicted to contain the landmark in an image formed using the image data obtained at the current time based on the internal state data indicating the internal state of the moving object at the time preceding the current time and the environmental map data at the time preceding the current time, and generates the landmark prediction signal containing information about the calculated predictive image area, and the landmark detection circuitry performs local search in which the predictive image area of the image formed using the image data at the current time is searched to detect an image area corresponding to the landmark, and the local search is started at an initial position that is a pixel position included in a central area of the predictive image area calculated by the landmark prediction circuitry and is sequentially performed at positions away from the initial position.

3. The moving object controller according to claim 2, wherein
the landmark prediction circuitry generates the landmark prediction signal including information about estimation accuracy of information about a position of the landmark obtained at the time preceding the current time, and
the landmark detection circuitry performs global search in which the image formed using the image data at the current time is searched to detect the image area corresponding to the landmark when the estimation accuracy of the positional information about the landmark obtained at the time preceding the current time is lower than a predetermined value based on the landmark prediction signal.

4. The moving object controller according to claim 2, wherein
the landmark prediction circuitry generates the landmark prediction signal including information about estimation accuracy of the internal state data of the moving object obtained at the time preceding the current time, and
the landmark detection circuitry performs global search in which the image formed using the image data at the current time is searched to detect the image area corresponding to the landmark when the estimation accuracy of the internal state data of the moving object obtained at the time preceding the current time is lower than a predetermined value based on the landmark prediction signal.

5. The moving object controller according to claim 2, wherein
the landmark detection circuitry includes detection information obtaining circuitry configured to store a value indicating the number of times the landmark has been detected in searching for the landmark within a predetermined period of time, and
the landmark detection circuitry performs the local search when the value indicating the number of times the landmark has been detected, the number being stored in the detection information obtaining circuitry, is greater than a predetermined value.

6. The moving object controller according to claim 2, wherein
the landmark detection circuitry includes detection information obtaining circuitry configured to store landmark detection information indicating whether the landmark has been detected in searching for the landmark within a predetermined period of time, and
the landmark detection circuitry performs global search in which the image formed using the image data at the current time is searched to detect the image area corresponding to the landmark when the landmark has not been detected within the predetermined period of time based on the landmark detection information stored by the detection information obtaining circuitry.

7. A moving object control method for controlling a moving object while performing processing for generating an environmental map expressed using information about a landmark and performing processing for estimating an internal state of the moving object, the method comprising:

obtaining observation data from an observable event, the observation data being image data obtained by the moving object capturing an environment surrounding the moving object;
generating a landmark prediction signal including predictive information about a landmark at a current time based on internal state data indicating an internal state of the moving object at a time preceding the current time, the internal state of the moving object being obtained by using at least one of (1) a state vector indicating an internal state for a position and an angle of the moving object and (2) variance-covariance matrix data obtained based on the position of the moving object, and environmental map data at the time preceding the current time;
detecting information about the landmark at the current time based on the landmark prediction signal generated by the step of generating the landmark prediction signal, and generating a landmark detection signal indicating a result of the detection; and
estimating the internal state of the moving object based on the observation data obtained by the step of obtaining the observation data and the landmark detection signal to obtain data indicating an estimation internal state of the moving object at the current time, and estimating the environmental map based on the landmark detection signal to obtain data indicating an estimation environmental map at the current time.

8. An integrated circuit used in a moving object controller for controlling a moving object while performing processing for generating an environmental map expressed using information about a landmark and performing processing for estimating an internal state of the moving object, the integrated circuit comprising:
observation obtaining circuitry configured to obtain observation data from an observable event, the observation data being image data obtained by the moving object capturing an environment surrounding the moving object;
landmark prediction circuitry configured to generate a landmark prediction signal including predictive information about a landmark at a current time based on internal state data indicating an internal state of the moving object at a time preceding the current time, the internal state of the moving object being obtained by using at least one of (1) a state vector indicating an internal state for a position and an angle of the moving object and (2) variance-covariance matrix data obtained based on the position of the moving object, and environmental map data at the time preceding the current time;
landmark detection circuitry configured to detect information about the landmark at the current time based on the landmark prediction signal generated by the landmark prediction circuitry, and generate a landmark detection signal indicating a result of the detection; and
state estimation circuitry configured to estimate the internal state of the moving object based on the observation data obtained by the observation obtaining circuitry and the landmark detection signal to obtain data indicating an estimation internal state of the moving object at the current time, and estimate the environmental map based on the landmark detection signal to obtain data indicating an estimation environmental map at the current time.

* * * * *